United States Patent
Aio et al.

(10) Patent No.: US 11,563,477 B2
(45) Date of Patent: Jan. 24, 2023

(54) INFORMATION PROCESSING DEVICE AND METHOD

(71) Applicant: SONY GROUP CORPORATION, Tokyo (JP)

(72) Inventors: Kosuke Aio, Tokyo (JP); Sawako Kiriyama, Tokyo (JP); Yuichi Hasegawa, Tokyo (JP); Takefumi Nagumo, Tokyo (JP); Asako Doi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,995

(22) PCT Filed: Jan. 9, 2020

(86) PCT No.: PCT/JP2020/000382
§ 371 (c)(1),
(2) Date: Jul. 8, 2021

(87) PCT Pub. No.: WO2020/153130
PCT Pub. Date: Jul. 30, 2020

(65) Prior Publication Data
US 2022/0103224 A1 Mar. 31, 2022

(30) Foreign Application Priority Data
Jan. 22, 2019 (JP) ............................. JP2019-008267

(51) Int. Cl.
*H04L 23/02* (2006.01)
*H04B 7/06* (2006.01)
(Continued)

(52) U.S. Cl.
CPC ........... *H04B 7/0695* (2013.01); *G06F 3/012* (2013.01); *H04B 17/373* (2015.01); *H04B 17/3913* (2015.01)

(58) Field of Classification Search
CPC ... H04L 1/0054; H04L 1/0005; H04N 19/139; H04N 19/43; H04N 19/597; G06T 19/006; G06T 7/50; G06F 3/011; G06F 2203/012
(Continued)

(56) References Cited

U.S. PATENT DOCUMENTS 8,391,334 B1 * 3/2013 Mower ..................... H04B 7/04
455/456.6
10,098,014 B1 * 10/2018 Shimizu .................. H04W 4/80
(Continued)

FOREIGN PATENT DOCUMENTS

EP    2475171 A1    7/2012
JP    2004-064300 A    2/2004
(Continued)

OTHER PUBLICATIONS

International Search Report and Written Opinion of PCT Application No. PCT/JP2020/000382, dated Apr. 7, 2020, 09 pages of ISRWO.

(Continued)

*Primary Examiner* — Khai Tran
(74) *Attorney, Agent, or Firm* — Chip Law Group

(57) ABSTRACT

The present technology relates to an information processing device and method capable of suppressing lowering in the quality of user experience. An information processing device includes: a wireless communication unit that sends transmission information to another information processing device through wireless communication; and a control unit that controls at least one of the wireless communication performed by the wireless communication unit, encoding of the transmission information, or a processing process on the transmission information on the basis of blockage prediction period information indicating a prediction result on blockage of a communication path to the another information processing device. The present technology can be applied to a content playback system.

19 Claims, 21 Drawing Sheets

(51) Int. Cl.
*H04B 17/373* (2015.01)
*H04B 17/391* (2015.01)
*G06F 3/01* (2006.01)

(58) Field of Classification Search
USPC .......................................................... 375/262
See application file for complete search history.

(56) References Cited

U.S. PATENT DOCUMENTS

| | | |
|---|---|---|
| 2011/0206130 A1 | 8/2011 | Koto et al. |
| 2013/0155816 A1* | 6/2013 | Li .............................. G01S 3/80 |
| | | 367/127 |
| 2016/0313790 A1* | 10/2016 | Clement ............ G02B 27/0093 |
| 2019/0261193 A1* | 8/2019 | Torsner ...................... G06T 7/20 |
| 2021/0126661 A1* | 4/2021 | Galeev .................. H04B 1/525 |
| 2021/0174601 A1* | 6/2021 | Ohashi .................. G06F 3/0481 |

FOREIGN PATENT DOCUMENTS

| | | |
|---|---|---|
| JP | 2015-114079 A | 6/2015 |
| WO | 2011/027440 A1 | 3/2011 |
| WO | 2017/099077 A1 | 6/2017 |

OTHER PUBLICATIONS

Oguma, et al., "Proactive Handover Based on Human Blockage Prediction using RGB-D Camera for mmWave Communications", IEICE Transactions on Communications, vol. E99-B, No. 8, Aug. 2016, Sections 1-6, pp. 1734-1744.

* cited by examiner

FIG. 13

| | COMMUNICATION PATH BLOCKAGE DURATION (PREDICTION) | | | | | | | |
|---|---|---|---|---|---|---|---|---|
| | $t_1$ | $t_2$ | $t_3$ | $t_4$ | $t_5$ | $t_6$ | $t_7$ | $t_8$ |
| COMMUNICATION PATH A | ● | ● | ● | | | | | |
| COMMUNICATION PATH B | | | ● | ● | | | | |
| COMMUNICATION PATH C | | | | ● | ● | | | |
| COMMUNICATION PATH D | | | | | | | ● | ● |

INFORMATION PROCESSING DEVICE AND METHOD

CROSS REFERENCE TO RELATED APPLICATIONS

This application is a U.S. National Phase of International Patent Application No. PCT/JP2020/000382 filed on Jan. 9, 2020, which claims priority benefit of Japanese Patent Application No. JP 2019-008267 filed in the Japan Patent Office on Jan. 22, 2019. Each of the above-referenced applications is hereby incorporated herein by reference in its entirety.

TECHNICAL FIELD

The present technology relates to an information processing device and method, and particularly to an information processing device and method capable of suppressing lowering in the quality of user experience.

BACKGROUND ART

In recent years, as a Virtual Reality (VR) system in which video information rendered and encoded by a console such as a high-end personal computer or a gaming machine is transmitted to a Head Mounted Display (HMD), a wireless VR system that uses no cables for communication paths (transmission paths) has been getting widespread. Many of such VR systems use millimeter waveband wireless techniques such as WiGig and WirelessHD, which can achieve high transmission rates.

Incidentally, it is common that millimeter waveband wireless signals are subjected to radio wave directivity control (beam forming) in order to increase the communication distance in relation to radio wave loss.

However, in this case, if an obstacle such as a person exists between a transmitter and a receiver and a communication path is blocked, video information is not correctly transmitted due to degradation of the communication environment, so that deterioration in the video quality, increase in transmission delay and the like occur, lowering the quality of user experience.

Thus, a technique has been proposed for suppressing transmission error in video information and audio information by detecting the position of the obstacle using information acquired from a camera provided to the console and selecting a communication path on the basis of the detection result (see Patent Literature 1, for example).

CITATION LIST

Patent Document

Patent Document 1: WO 2017/099077

SUMMARY OF THE INVENTION

Problems to be Solved by the Invention

However, in the technique disclosed in Patent Document 1, it is detected whether or not the communication path is blocked by the obstacle at the present point of time, and thus the communication environment is temporarily degraded in a case where the selected communication path is suddenly blocked, for example. Therefore, even though it is possible to shorten the period in which the communication path is blocked, deterioration in the video quality, increase in the transmission delay and the like still occur, lowering the quality of user experience.

The present technology has been made in view of such circumstances, and is to enable suppressing lowering in the quality of user experience.

Solutions to Problems

An information processing device of a first aspect of the present technology includes: a wireless communication unit that sends transmission information to another information processing device through wireless communication; and a control unit that controls at least one of the wireless communication performed by the wireless communication unit, encoding of the transmission information, or a processing process on the transmission information on the basis of blockage prediction period information indicating a prediction result on blockage of a communication path to the another information processing device.

An information processing method of a first aspect of the present technology includes: a step of sending transmission information to another information processing device through wireless communication; and a step of controlling at least one of the wireless communication performed by the wireless communication unit, encoding of the transmission information, or a processing process on the transmission information on the basis of blockage prediction period information indicating a prediction result on blockage of a communication path to the another information processing device.

In the first aspect of the present technology, transmission information is sent to another information processing device through wireless communication, and at least one of the wireless communication performed by the wireless communication unit, encoding of the transmission information, or a processing process on the transmission information is controlled on the basis of blockage prediction period information indicating a prediction result on blockage of a communication path to the another information processing device.

An information processing device of a second aspect of the present technology includes: a wireless communication unit that receives video information sent from another information processing device through wireless communication; and a control unit that controls a processing process on the video information on the basis of blockage prediction period information indicating a prediction result on blockage of a communication path to the another information processing device.

An information processing method of a second aspect of the present technology includes a step of receiving video information sent from another information processing device through wireless communication and controlling a processing process on the video information on the basis of blockage prediction period information indicating a prediction result on blockage of a communication path to the another information processing device.

In the second aspect of the present technology, video information sent from another information processing device through wireless communication is received, and a processing process on the video information is controlled on the basis of blockage prediction period information indicating a prediction result on blockage of a communication path to the another information processing device.

BRIEF DESCRIPTION OF DRAWINGS

FIG. 13 is a diagram showing an example of the communication path blockage prediction table.

MODE FOR CARRYING OUT THE INVENTION

An embodiment to which the present technology is applied will be described below with reference to the drawings.

First Embodiment

<Example Configuration of Content Playback System>

The present technology is to enable suppressing lowering in the quality of user experience by predicting an event of a communication path being blocked in advance on the basis of movement of an obstacle and performing control on wireless communication, encoding, video display, and the like on the basis of a blockage start time, a blockage duration, and the like obtained by the prediction.

Note that the following description will be given by using an example in which the present technology is applied to a content playback system for playing back a VR content (hereinafter also referred to simply as a content).

However, the present technology can be applied to any system as long as the system performs transfer of any transmission information through wireless communication. Therefore, a content transferred as transmission information through wireless communication is not limited to a VR content and may be any content such as a normal video content or a sound-only content.

Figure 1:
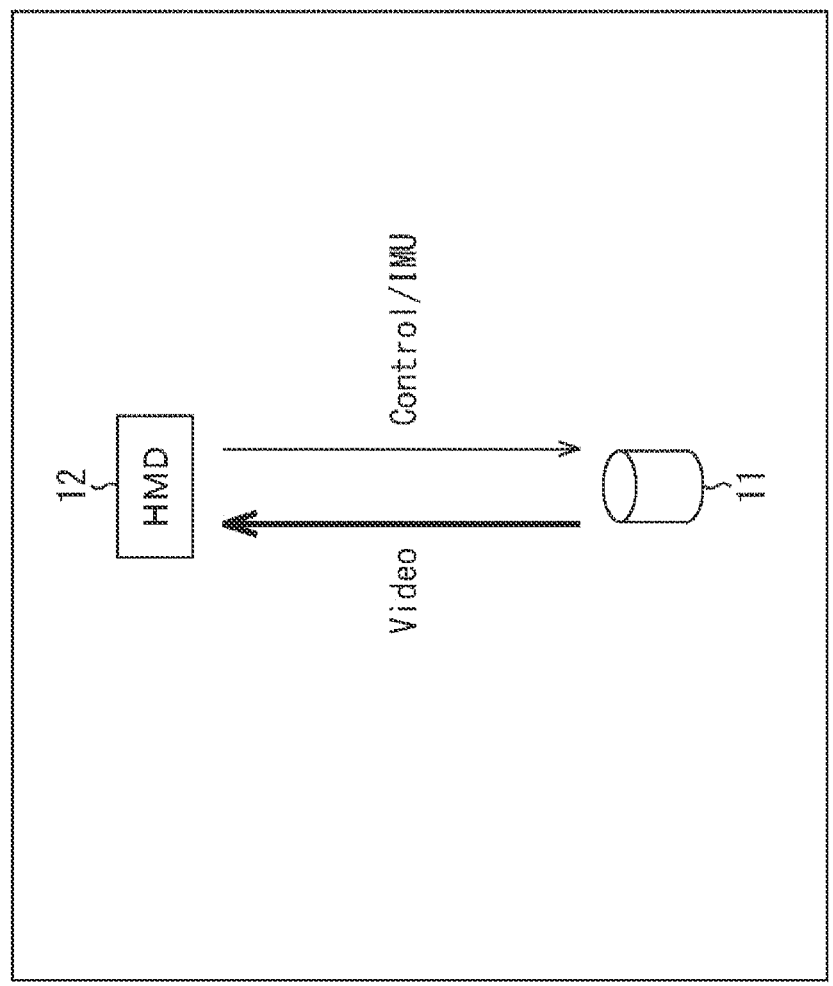
FIG. 1 is a diagram showing an example configuration of a content playback system.

FIG. 1 shows an example configuration of an embodiment of a content playback system to which the present technology is applied.

In FIG. 1, the content playback system includes a console 11 and an HMD 12, which are in a same room.

The console 11 is an information processing device serving as a transmitter, and generates video information constituting a content and transmits (sends) the video information to the HMD 12, which is the device on the other end of communication, through wireless communication.

The HMD 12 is an information processing device serving as a receiver, and receives the video information sent from the console 11, which is the device on the other end of communication, through the wireless communication.

Furthermore, the HMD 12 is worn on the head of a user who experiences the content, and plays back the content on the basis of the received video information. That is, the HMD 12 also serves as a wearable playback device.

Furthermore, the HMD 12 sends, to the console 11 through wireless communication, various types of control information and position and attitude information necessary for playing back the content and sending/receiving the video information.

Here, the position and attitude information is Inertial Measurement Unit (IMU) information indicating the position and attitude of the HMD 12 in a real space, in other words, the position and attitude of the head of the user wearing the HMD 12.

Note that the wireless communication scheme for transmitting the video information and the wireless communication scheme for transmitting the control information and the position and attitude information may be the same or different. However, it is often the case that the video information, which basically requires a high transmission rate, is transmitted in a wireless communication scheme (wireless standard) that uses the 60-GHz band or the like and the control information and the position and attitude information, for which a low transmission rate is sufficient, are transmitted in a wireless communication scheme (wireless standard) such as Bluetooth (registered trademark).

Furthermore, although an example in which the content playback system includes one console 11 and one HMD 12 is described here, the configuration of the content playback system is not limited to the example shown in FIG. 1 and may be any configuration.

For example, it is sufficient that a plurality of communication devices between which connection is established exists and there is another communication device as a neighboring terminal for each of those communication devices, and the positional relationship between the communication devices may be any relationship. Besides, although the HMD 12 is described here as an example of an information processing device serving as a receiver, the information processing device serving as the receiver may be any other device such as a mobile phone.

<Example Configuration of Console>

Next, configurations of the console 11 and the HMD 12 constituting the content playback system will be described.

Figure 2:
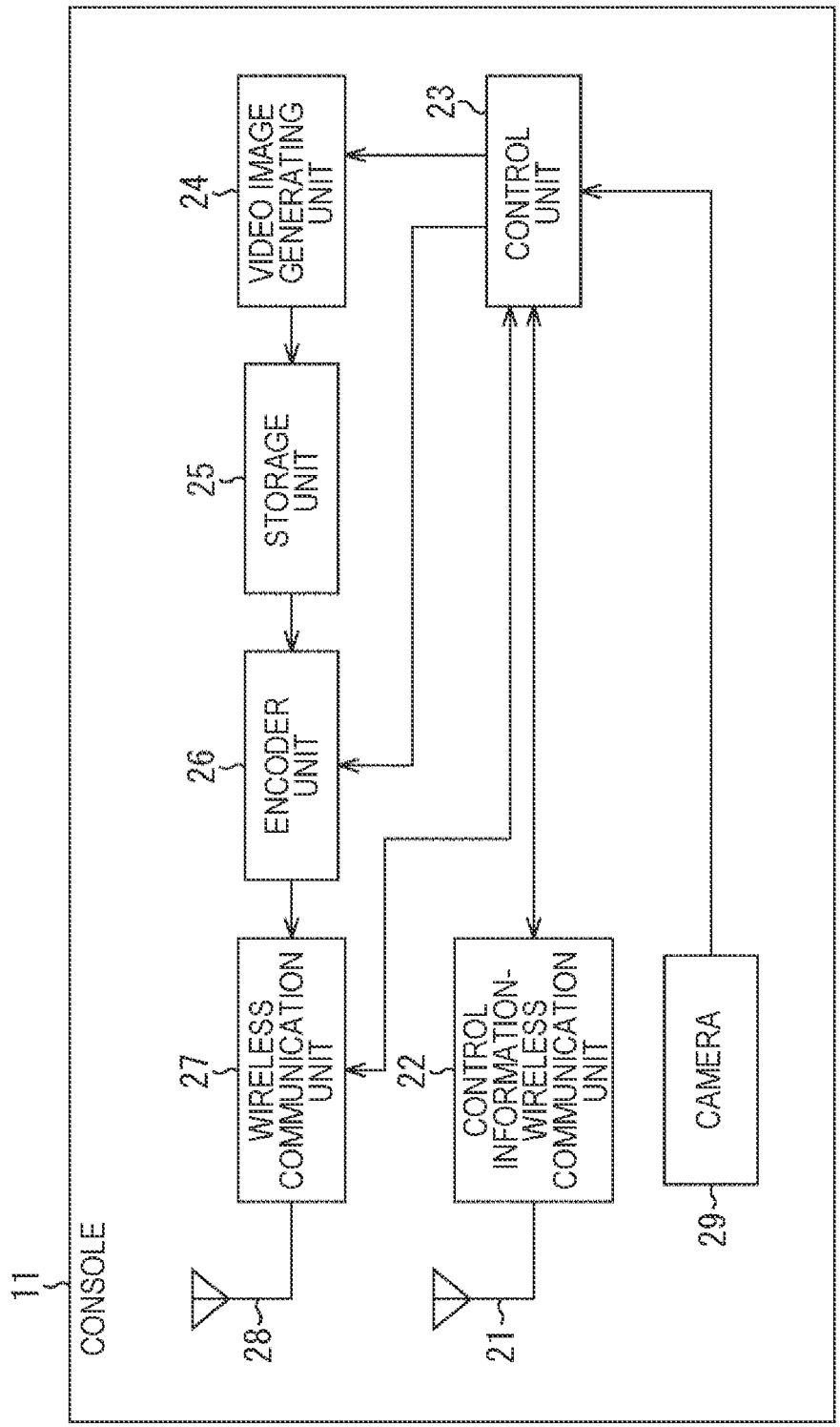
FIG. 2 is a diagram showing an example configuration of a console.

For example, the console 11 is configured as shown in FIG. 2.

The console 11 shown in FIG. 2 includes an antenna 21, a control information-wireless communication unit 22, a control unit 23, a video image generating unit 24, a storage unit 25, an encoder unit 26, a wireless communication unit 27, an antenna 28, and a camera 29.

The control information-wireless communication unit 22 performs wireless communication at a low transmission rate using the antenna 21.

That is, the control information-wireless communication unit 22 sends, from the antenna 21 through the wireless communication, information supplied from the control unit 23, and receives information (wireless signals) sent from the HMD 12 through wireless communication by using the antenna 21 and supplies it to the control unit 23.

Here, the wireless communication at the low transmission rate refers to communication at a lower transmission rate than that of wireless communication in the wireless communication unit 27.

When receiving a wireless signal, the control information-wireless communication unit 22 converts the wireless signal received by the antenna 21 into a digital signal, extracts various types of control information, position and attitude information, and the like from the obtained digital signal, and supplies them to the control unit 23.

Note that the control information mentioned here refers to, for example, arrival angle information indicating the angle of arrival the wireless signal at the HMD 12, rotation angle information indicating the rotation angle of the HMD 12, and the like.

The control unit 23 controls overall operation of the console 11.

For example, the control unit 23 generates information needed for video images of the content to be transmitted to the HMD 12, for example, information needed for rendering the video images, on the basis of the control information and the position and attitude information received from the HMD 12 and supplied from the control information-wireless communication unit 22, and supplies it to the video image generating unit 24.

Furthermore, for example, the control unit 23 generates blockage prediction period information regarding prediction on blockage of a communication path between the console 11 and the HMD 12 on the basis of a surrounding environment image supplied from the camera 29, the position and attitude information supplied from the control information-wireless communication unit 22, and the like, and supplies it to the wireless communication unit 27 and the encoder unit 26.

Here, the surrounding environment image is an image whose subject is a surrounding scene of the console 11 and that contains at least the HMD 12 as the subject.

Furthermore, the blockage prediction period information is information indicating a prediction result on blockage (shutoff) of a communication path between the console 11 and the HMD 12 in the future, and it is assumed here that a communication path blockage prediction table, described later, is generated as the blockage prediction period information.

Besides, the control unit 23 controls at least one process of wireless communication performed by the wireless communication unit 27, encoding of video information by the encoder unit 26, or a processing process on video information in the HMD 12 on the basis of the communication path blockage prediction table.

The video image generating unit 24 generates video information that is moving image data for playing back video images of the content by performing rendering on the basis of information supplied from the control unit 23, and supplies it to the storage unit 25.

For example, an image data group including a plurality of pieces of image data captured at mutually different viewpoints is retained as data for generating video information in the console 11, and the video image generating unit 24 performs rendering on the basis of the image data group and the position and attitude information to generate video information with a viewpoint position and a line-of-sight direction corresponding to the position and attitude information.

The storage unit 25 temporarily stores the video information supplied from the video image generating unit 24 until a process of encoding the video information is started.

The encoder unit 26 reads the video information temporarily stored in the storage unit 25 to perform the encoding process in accordance with control of the control unit 23, and supplies code information thereby obtained to the wireless communication unit 27. For example, the encoding process by the encoder unit 26 is controlled by the control unit 23 on the basis of the communication path blockage prediction table (blockage prediction period information) and the like.

The wireless communication unit 27 performs wireless communication at a high transmission rate using the antenna 28.

That is, the wireless communication unit 27 sends, from the antenna 28 through the wireless communication, the code information supplied from the encoder unit 26, and receives information (wireless signals) sent from the HMD 12 through wireless communication by using the antenna 28 and supplies it to the control unit 23.

Here, the wireless communication at the high transmission rate refers to communication at a higher transmission rate than that of wireless communication in the control information-wireless communication unit 22 and to communication at an enough transmission rate at which code information regularly generated can be transmitted without delay of delivery.

When sending a wireless signal, that is, code information, the wireless communication unit 27 generates a wireless communication packet in which the code information is stored on the basis of the code information supplied from the encoder unit 26, and converts the generated wireless communication packet into a wireless signal that is an analog signal.

The wireless communication unit 27 emits the thus-obtained wireless signal as electromagnetic waves (radio waves) via the antenna 28 to send the wireless signal to the HMD 12.

Furthermore, when receiving a wireless signal, the wireless communication unit 27 receives electromagnetic waves emitted by the HMD 12 as a wireless signal via the antenna 28, converts it into a digital signal, and supplies various pieces of information extracted from the obtained digital signal to the control unit 23.

Besides, the wireless communication unit 27 also performs switching (selection) of the communication path to the HMD 12 and Beam Forming (BF) training (beam forming training) for switching the communication path in accordance with control of the control unit 23.

The camera 29 captures an image of a subject around the console 11, and supplies a surrounding environment image thereby obtained to the control unit 23.

Such a camera 29 is provided mainly for grasping the position and attitude of the HMD 12, that is, the position and attitude of the user wearing the HMD 12. In the control unit 23, mapping of communication paths and movement line prediction (motion prediction) of an obstacle, which will be described later, are performed and the communication path blockage prediction table is generated on the basis of the surrounding environment image obtained by the camera 29.

Note that, although an example in which the camera 29 is provided to the console 11 is described here, the camera 29 may also be provided outside the console 11.

<Example Configuration of HMD>

Next, an example configuration of the HMD 12 will be described. For example, the HMD 12 is configured as shown in FIG. 3.

Figure 3:
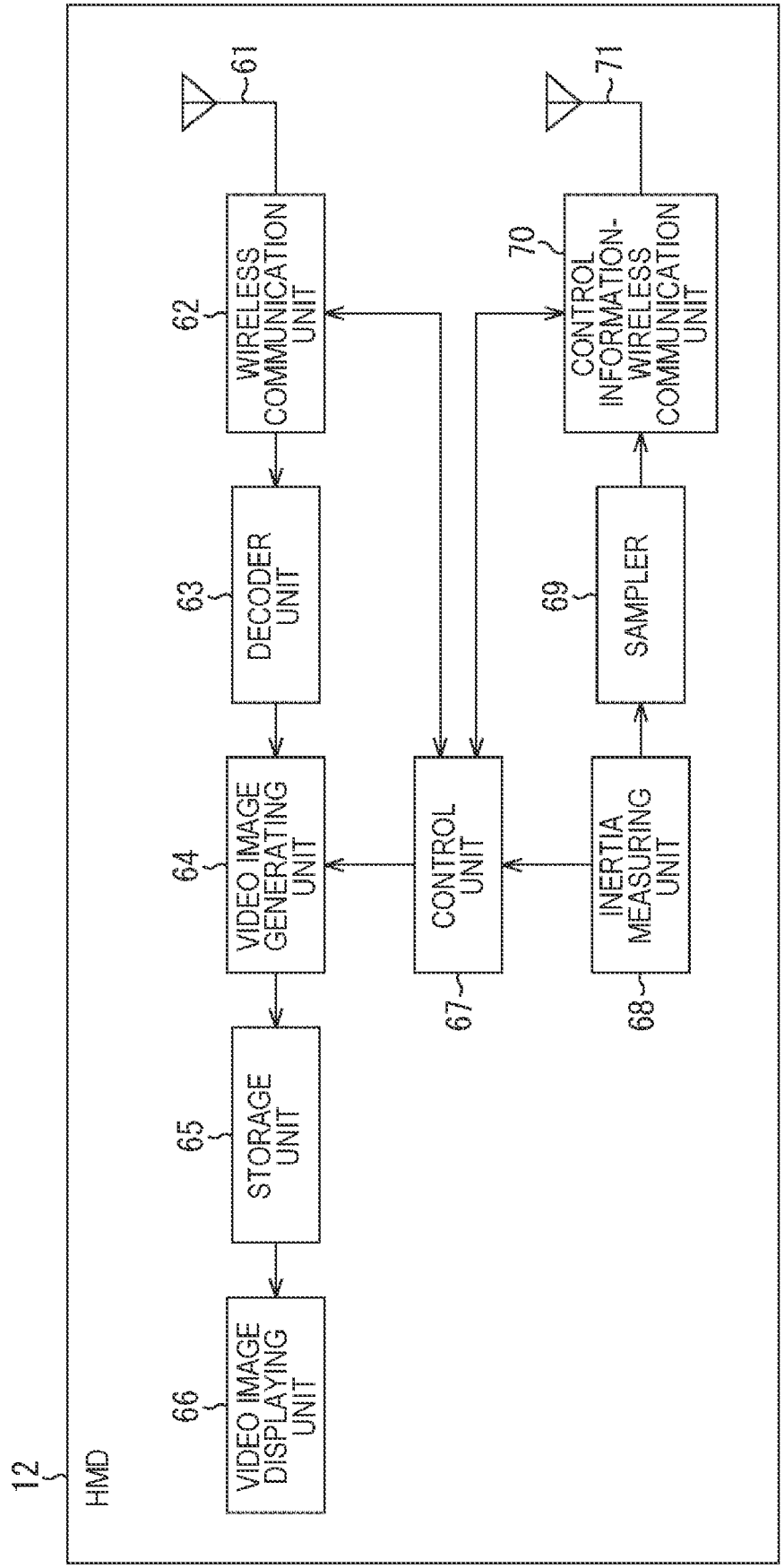
FIG. 3 is a diagram showing a configuration of an HMD.

The HMD 12 shown in FIG. 3 includes an antenna 61, a wireless communication unit 62, a decoder unit 63, a video image generating unit 64, a storage unit 65, a video image displaying unit 66, a control unit 67, an inertia measuring unit 68, a sampler 69, a control information-wireless communication unit 70, and an antenna 71.

The wireless communication unit 62 performs wireless communication at a high transmission rate using the antenna 61.

That is, the wireless communication unit 62 receives a wireless signal sent by the wireless communication unit 27 of the console 11 and supplies it to the decoder unit 63 and the control unit 67, and sends information supplied from the control unit 67 to the antenna 61 through wireless communication.

For example, the wireless communication unit 62 converts a wireless signal received by the antenna 61 into a digital signal, and extracts code information from the obtained digital signal and supplies it to the decoder unit 63.

The decoder unit 63 decodes the code information supplied from the wireless communication unit 62, and supplies video information thereby obtained to the video image generating unit 64.

The video image generating unit 64 performs a processing process on the video information supplied from the decoder unit 63 as needed in accordance with control of the control unit 67, and generates video information for video images to be finally presented to the user. For example, in the video image generating unit 64, the processing process is performed when the communication condition of the communication path to the console 11 is degraded. The video image generating unit 64 supplies the generated video information to the storage unit 65 for storage.

The storage unit 65 temporarily stores the video information supplied from the video image generating unit 64 until it is supplied to the video image displaying unit 66. The video image displaying unit 66 includes a liquid crystal display, for example, and displays video images of the content on the basis of the video information supplied from the storage unit 65.

The control unit 67 controls overall operation of the HMD 12.

For example, the control unit 67 controls the processing process on the video information in the video image generating unit 64 on the basis of control information received from the console 11 and supplied from the control information-wireless communication unit 70, position and attitude information supplied from the inertia measuring unit 68, and the like.

At this time, the control unit 67 may select one or more processing processes from a plurality of processing processes on the basis of blockage prediction period information supplied as control information or the like and causes the video image generating unit 64 to perform the selected processing processes, for example.

The inertia measuring unit 68 includes a gyro sensor or the like, for example, and detects (measures) movement of the HMD 12, in particular the rotating direction of the HMD 12, generates position and attitude information on the basis of the detection result, and supplies it to the control unit 67 and the sampler 69.

The sampler 69 samples the position and attitude information supplied from the inertia measuring unit 68 into a quantity of information that can be wirelessly transmitted, and supplies it to the control information-wireless communication unit 70. For example, in the sampler 69, a process of down-sampling the position and attitude information in accordance with the frame rate of the video information is performed as the sampling process.

The control information-wireless communication unit 70 performs wireless communication at a low transmission rate using the antenna 71.

That is, the control information-wireless communication unit 70 sends, from the antenna 71 through wireless communication, a wireless signal based on control information such as the position and attitude information supplied from the sampler 69 and arrival angle information and rotation angle information supplied from the control unit 67.

Furthermore, the control information-wireless communication unit 70 receives information (wireless signal) sent from the console 11 through wireless communication by using the antenna 71, and supplies it to the control unit 67.

The wireless communication performed by the control information-wireless communication unit 70 at the low transmission rate is communication performed with the control information-wireless communication unit 22 of the console 11.

For example, when sending a wireless signal, the control information-wireless communication unit 70 generates a wireless communication packet in which the position and attitude information and the control information are stored, and converts the generated wireless communication packet into a wireless signal that is an analog signal.

The control information-wireless communication unit 70 emits the thus-obtained wireless signal as electromagnetic waves via the antenna 71 to send the wireless signal to the console 11.

Furthermore, when receiving a wireless signal, the control information-wireless communication unit 70 receives electromagnetic waves emitted by the console 11 as a wireless signal via the antenna 71, converts it into a digital signal, and supplies various pieces of information extracted from the obtained digital signal to the control unit 67.

<Description of Video Information Sending Process>

Next, operations of the console 11 and the HMD 12 will be described.

First, a process performed when video information is transferred between the console 11 and the HMD 12 and a content is played back on the basis of the video information will be described.

In such a case, the console 11 performs a video information sending process to send the video information, and the HMD 12 performs a video playback process to play back the content based on the video information.

The video information sending process performed by the console 11 will be described below with reference to the flowchart of FIG. 4. This video information sending process is performed for each frame of the video information, for example.

In step S11, the video image generating unit 24 generates video information in accordance with control of the control unit 23, and supplies it to the storage unit 25.

For example, the control unit 23 supplies the position and attitude information received from the HMD 12 to the video image generating unit 24, and instructs generation of video information. Then, the video image generating unit 24 performs rendering on the basis of the position and attitude information supplied from the control unit 23 and the image data group, and generates video information with a viewpoint position and a line-of-sight direction corresponding to the position and attitude information.

In step S12, the encoder unit 26 encodes the video information stored in the storage unit 25 in accordance with control of the control unit 23, and supplies code information thereby obtained to the wireless communication unit 27.

In step S13, the wireless communication unit 27 generates a wireless communication packet including the code information supplied from the encoder unit 26 in accordance with control of the control unit 23.

In step S14, the wireless communication unit 27 generates a wireless signal that is an analog signal on the basis of the wireless communication packet, and sends the wireless signal to the HMD 12 by using the antenna 28. The video information, that is, the wireless signal based on the code information is thus sent, and then the video information sending process ends.

The console 11 generates the video information and sends it to the HMD 12 in the above-described manner. In this manner, the content can be played back on the basis of the video information in the HMD 12.

<Description of Video Playback Process>

In response to the video information sending process being performed, the video playback process is performed in the HMD 12. The video playback process performed by the HMD 12 will be described below with reference to the flowchart of FIG. 5.

Figure 4:
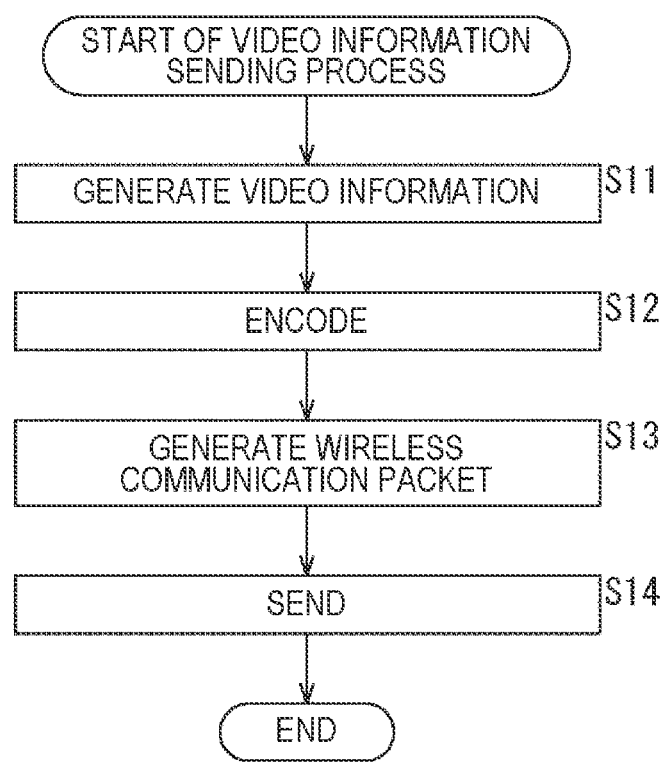
FIG. 4 is a flowchart illustrating a video information sending process.

In step S41, the wireless communication unit 62 receives the wireless signal sent from the console 11 in the process of step S14 in FIG. 4 by using the antenna 61, and supplies it to the decoder unit 63. That is, the wireless communication unit 62 extracts code information from the received wireless signal, and supplies it to the decoder unit 63.

In step S42, the decoder unit 63 decodes the code information supplied from the wireless communication unit 62, and supplies video information thereby obtained to the video image generating unit 64.

In step S43, the control unit 67 determines whether or not to perform a processing process on the video information.

In a case where it is determined not to perform the processing process in step S43, the video image generating unit 64 supplies the video information supplied from the decoder unit 63 directly to the storage unit 65 for storage, and the process then proceeds to step S45.

In contrast, in a case where it is determined to perform the processing process in step S43, the control unit 67 instructs the video image generating unit 64 to perform the processing process, and the process then proceeds to step S44. Then, in step S44, the video image generating unit 64 performs the processing process on the video information supplied from the decoder unit 63 in accordance with control of the control unit 67, and supplies it to the storage unit 65.

For example, whether or not to perform the processing process is determined on the basis of control information received from the console 11 and supplied to the control unit 67 by the control information-wireless communication unit 70.

Here, the control information used for the determination on whether or not to perform the processing process may be designation information designating the processing process to be performed and the blockage prediction period information, or may be only the blockage prediction period information. Note that the control information is not limited to the blockage prediction period information and may also be information regarding prediction on blockage of the communication path.

For example, in a case where the control unit 67 determines whether or not to perform the processing process on the video information on the basis of the blockage prediction period information, the control unit 67 can also determine (select) which processing process to perform on the video information on the basis of the blockage prediction period information.

The processing process performed in step S44 is a process for suppressing lowering in the quality of user experience due to degradation of the communication condition of the communication path, such as a process of blurring a video image or a process of adding a text message or the like to a video image based on the video information.

In a case where the process of step S44 is performed or it is determined not to perform the processing process in step S43, the video image displaying unit 66 in step S45 displays a video image of the content on the basis of the video information stored in the storage unit 65, and the video playback process ends.

The HMD 12 receives the video information from the console 11 and plays back the content in the above-described manner. By appropriately performing the processing process on the video information at this time, it is possible to suppress lowering in the quality of user experience even in a case where deterioration in the video quality and transmission delay occur due to degradation of the communication condition.

<Blockage of Communication Path>

Incidentally, as described with reference to FIGS. 4 and 5, when the console 11 and the HMD 12 send/receive video information, the communication path for transmitting the video information may be blocked by an obstacle such as another user.

Figure 6:
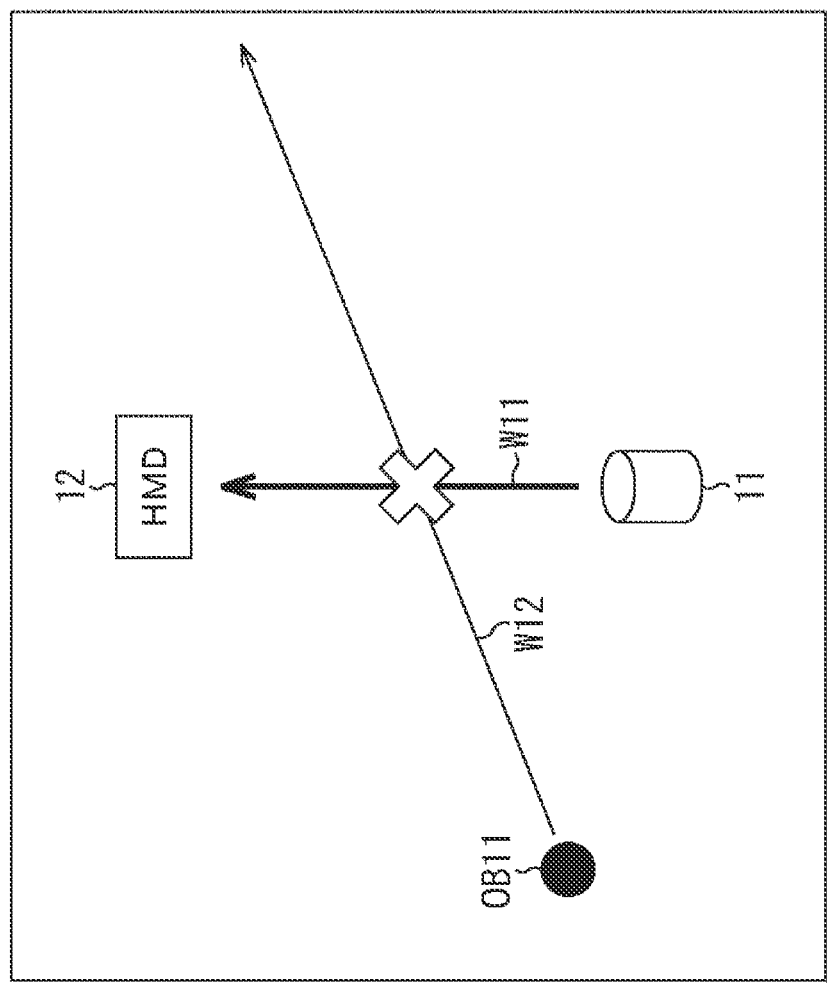
FIG. 6 is a diagram illustrating blockage of a communication path.

For example, it is assumed that, as shown in FIG. 6, the console 11 and the HMD 12 are sending/receiving video information by using a communication path connecting the console 11 and the HMD 12 with a straight line and indicated by arrow W11.

In such a case, if an obstacle OB11 such as another user different from the user wearing the HMD 12 is moving in the direction of arrow W12, for example, the communication path indicated by arrow W11 is temporarily blocked by the obstacle OB11 at a certain timing.

Then, the communication environment for sending/receiving the video information, that is, the communication condition of the communication path between the console 11 and the HMD 12 is degraded, and in some cases the HMD 12 cannot correctly receive the video information sent by the console 11, causing lowering in the quality of user experience.

Figure 7:
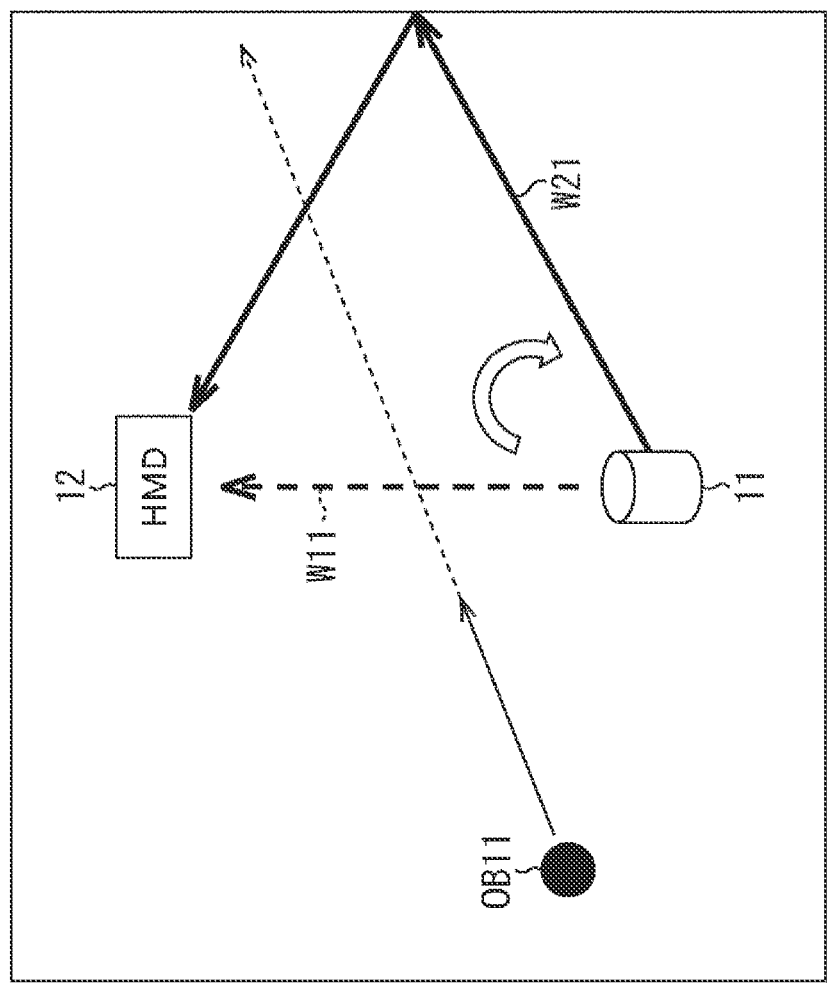
FIG. 7 is a diagram illustrating prediction of blockage of a communication path.

Thus, the console 11 is configured to predict movement of the obstacle OB11 and predict blockage of the communication path on the basis of the prediction result as shown in FIG. 7. Note that portions in FIG. 7 that correspond to those of the case of FIG. 6 are given the same reference characters, and descriptions thereof will be omitted as appropriate.

In the example shown in FIG. 7, the console 11 obtains a blockage start time indicating a timing (time) at which the communication path indicated by arrow W11 is blocked by the obstacle OB11 and a blockage duration that is a duration for which the communication path is blocked by the obstacle OB11. In other words, a communication path blockage prediction table indicating the blockage start time and the blockage duration is generated as a prediction result on blockage of the communication path.

The console 11 performs communication by switching the communication path for transmitting the video information from the communication path indicated by arrow W11 to the communication path indicated by arrow W21 during a time period in which the communication path indicated by arrow W11 is blocked by the obstacle OB11 (hereinafter referred to as a blockage period) on the basis of the communication path blockage prediction table obtained by the prediction.

Here, the communication path indicated by arrow W21 is a communication path that is a reflection route in which a wireless signal output from the console 11 is reflected by a wall inside the room or the like and reaches the HMD 12.

In the console 11, the communication path used for transmitting the video information is switched to the communication path indicated by arrow W21 in advance before the communication path indicated by arrow W11 is blocked by the obstacle OB11. In this manner, the blockage of the communication path is avoided, deterioration in the video quality and the occurrence of transmission delay due to frame loss (transmission error) of the video information are suppressed, and as a result the lowering in the quality of user experience is suppressed.

Besides, in the console 11, the lowering in the quality of user experience can be suppressed by also controlling the encoding by the encoder unit 26 and controlling the processing process on the video information on the basis of the communication path blockage prediction table, as will be described later.

<Description of Communication Control Process>

The console 11 performs a communication control process to appropriately perform control relating to transmission of the video information, control of the encoding, control of the processing process, and the like as described with reference to FIG. 7 while performing the video information sending process described with reference to FIG. 4. This communication control process may be performed regularly or may be performed irregularly at desired timings.

The communication control process performed by the console 11 will be described below with reference to the flowchart of FIG. 8.

In step S71, the console 11 performs a communication path mapping process. Note that in the communication path mapping process, the details of which will be described later, communication paths to the HMD 12 are mapped onto a surrounding environment image so that the communication paths are visually identified.

In step S72, the console 11 performs a communication path blockage prediction table updating process. Note that in the communication path blockage prediction table updating process, the details of which will be described later, the communication path blockage prediction table is updated on the basis of the mapping result in step S71.

In step S73, the control unit 23 determines whether or not the communication path being used will be blocked on the basis of the updated communication path blockage prediction table obtained in step S72.

By using the communication path blockage prediction table, whether or not the communication path currently used for transmitting the video information will be blocked in the future, that is, the blockage start time and the blockage duration for which the communication path is blocked can be identified. In other words, the blockage period in which the communication path is blocked can be identified.

In a case where it is identified that the communication path currently used will be blocked in a predetermined time from the present time by using the communication path blockage prediction table, the control unit 23 in step S73 determines that communication path being used will be blocked. Note that, more specifically, it is also determined in step S73 that the communication path being used will be blocked in a case where the communication path currently used is already blocked.

In a case where it is determined in step S73 that the communication path being used will not be blocked, the process proceeds to step S83.

In contrast, in a case where it is determined in step S73 that the communication path being used will be blocked, the control unit 23 in step S74 obtains the blockage start time and the blockage duration for the communication path being used on the basis of the communication path blockage prediction table.

In step S75, the control unit 23 determines whether or not there is a sufficient time until the start of blockage of the communication path being used on the basis of the blockage start time obtained in step S74.

Here, it is determined that there is sufficient time in a case where the time interval from the present time until the blockage start time is greater than or equal to a predetermined threshold, for example.

Note that the threshold used in step S75 is determined on the basis of the time needed for BF training, which is training of beam forming for enabling communication on another communication path different from the communication path currently used to be started, for example. In other words, it is determined in step S75 that there is enough time until the starting of blockage in a case where the BF training can be performed before the blockage start time, for example.

In a case where it is determined in step S75 that there is not enough time until the blockage, the process then proceeds to step S80. In this case, since there is no time to perform the BF training and the communication path cannot be switched, the lowering in the quality of user experience is suppressed by control of the encode or the like instead of the switching of the communication path.

On the other hand, in a case where it is determined in step S75 that there is enough time until the blockage, that is, there is enough time to switch the communication path, the process proceeds to step S76.

In step S76, the console 11 performs a BF training process. Note that in the BF training process, the details of which will be described later, BF training is performed for one or more communication paths different from the communication path currently used, and communication with the HMD 12 using each communication path is enabled.

Here, a communication path on which the BF training is performed in the BF training process and for which communication with the HMD 12 is enabled to start becomes a candidate for the switching destination from the communication path currently used.

In step S77, the control unit 23 determines whether or not there is a candidate for the switching destination for which the BF training is performed in step S76. That is, it is determined whether or not there is another usable (available) communication path instead of the communication path currently used.

In a case where it is determined in step S77 that there is no candidate for the switching destination, the communication path cannot be switched, and thus the process then proceeds to step S80. In this case as well, the lowering in the quality of user experience is suppressed by control of the encode or the like instead of the switching of the communication path.

In contrast, in a case where it is determined in step S77 that there is a candidate for the switching destination, the control unit 23 in step S78 controls the switching of the communication path.

For example, the control unit 23 regards, among candidates for the switching destination obtained in step S76, a candidate whose communication path condition, that is, communication condition is the best as a switching destination communication path, and instructs the wireless communication unit 27 to switch the communication path so as to perform wireless communication using that communication path.

Then, the wireless communication unit 27 switches the communication path used for sending a wireless signal to the HMD 12 to the communication path designated from the control unit 23 in response to the instruction from the control unit 23.

Thus, in step S14 in FIG. 4 performed after that, a communication path for which blockage does not occur is used to send a wireless signal based on the video information to the HMD 12, for example. That is, electromagnetic waves based on the wireless signal are radiated from the antenna 28 in the direction of the switched communication path.

Note that the communication condition of each communication path can be identified on the basis of a result of the BF training and feedback information sent from the HMD 12 at a high transmission rate, for example. Furthermore, the selection (determination) of the switching destination communication path may be performed by the wireless communication unit 27.

Here, the feedback information includes information regarding the communication condition such as a received power and Signal to Interference Noise Ratio (SINR) when the HMD 12 receives wireless signals sent by the antenna 28 of the console 11, that is, training data for the BF training and the video information. For example, a communication path whose received power and SINR included in the feedback information are high can be regarded as a communication path with a good communication condition. The wireless communication unit 27 extracts the feedback information from wireless signals received by the antenna 28 and supplies it to the control unit 23.

In step S79, the control unit 23 determines whether or not the condition of the switched communication path is good on the basis of a BF training result and the feedback information supplied from the wireless communication unit 27.

Here, it may be determined that the condition of the communication path is good in a case where the received power included in the feedback information received after the switching is greater than or equal to a predetermined threshold, for example. Furthermore, it may be determined whether or not the condition of the communication path is good by comparing the BF training result and the feedback information received after the switching.

In a case where it is determined in step S79 that the switched communication path is not good, the process then proceeds to step S80.

In this case, since the quality of user experience may be lowered due to deterioration in the video quality and occurrence of transmission delay, the lowering in the quality of user experience is further suppressed by control of the encoding or the like in addition to the switching of the communication path.

In contrast, in a case where it is determined in step S79 that the switched communication path is good, the process proceeds to step S83 because the control of the encoding or the like is not needed.

The process of step S80 is performed in a case where it is determined in step S75 that there is not enough time until blockage, a case where it is determined in step S77 that there is no candidate for the switching destination, or a case where it is determined in step S79 that the condition of the switched communication path is not good.

In step S80, the control unit 23 performs control of the method of encoding the video information in the encoder unit 26.

For example, the control unit 23 controls the encoder unit 26 to encode the video information by an encoding method different from a normal encoding method during a time period that is substantially the same as the blockage period in which the communication path is blocked or a time period in which the condition of the communication path is not good.

Specifically, for example, the control unit 23 supplies, to the decoder unit 63, information indicating a blockage start time and a blockage duration, that is, blockage prediction period information for the communication path being used at the present point of time. Note that a communication path blockage prediction table may be supplied as the blockage prediction period information.

Then, in step S12 of FIG. 4, the encoder unit 26 encodes the video information in an encoding method different from a normal encoding method on the basis of the blockage prediction period information supplied from the control unit 23.

For example, in a case where the communication path currently used will be blocked, the encoding is performed by the encoding method different from the normal encoding method during a time period including the blockage period in which the communication path is blocked.

Furthermore, for example, in a case where the communication path currently used will not be blocked but the condition of the communication path is not good, that is, it is determined to be not good in step S79, the encoding is continuously performed by the encoding method different from the normal encoding method until it is determined that the condition of the communication path is good.

Here, the encoding method different from the normal encoding method refers to an encoding method that can suppress the lowering in the quality of user experience as compared to the normal encoding method even when the communication path is blocked. That is, the encoding method different from the normal encoding method is an encoding method such that frame loss (transmission error), that is, lack of frames of the video information is lower than the normal encoding method.

In such a case where it is difficult to suppress the lowering in the quality of user experience by switching the communication path, the lowering in the quality of user experience can be suppressed by controlling the encoding process of changing the encoding method.

Note that the encoding method after the change may be selected from a plurality of encoding methods by the control unit 23 or the encoder unit 26.

In step S81, the control unit 23 determines whether or not the blockage period of the communication path being used is short. For example, it is determined that the blockage period is short in a case where the blockage duration of the communication path being used is less than or equal to a predetermined threshold.

For example, in a case where the communication path is not switched, the blockage duration obtained in step S74 can be used as the blockage duration. Furthermore, in a case where the communication path is switched, the blockage duration of the communication path after the switching can be obtained from the communication path blockage prediction table obtained in step S72.

In a case where it is determined in step S81 that the blockage period is short, the process then proceeds to step S83.

In contrast, in a case where it is determined in step S81 that the blockage period is not short, the control unit 23 in step S82 performs control of the processing process on the video information.

For example, in a case where the blockage period is long, playback of the video information may need to be stopped for a relatively long time due to transmission delay or the like in the HMD 12, which plays back the content. If the playback of the video information is stopped for a long time without any instruction from the user, an unnatural feeling occurs, and the user may be dissatisfied.

Figure 5:
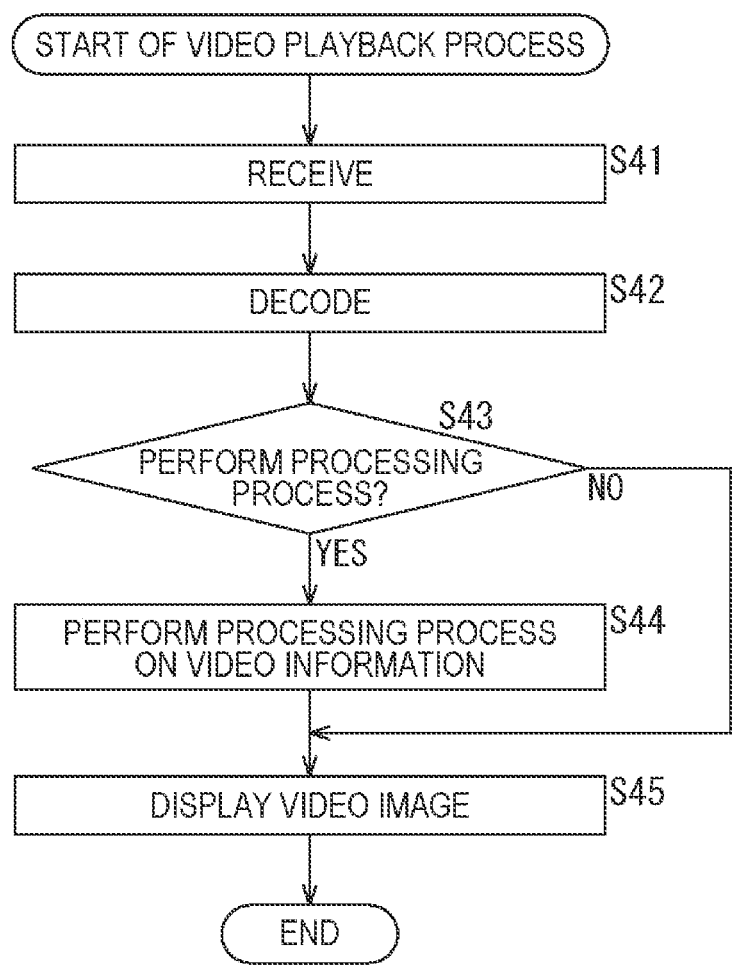
FIG. 5 is a flowchart illustrating a video playback process.

In such a case, it is possible to relieve the dissatisfaction of the user and suppress the lowering in the quality of user experience by performing a processing process such as a process of blurring a video image or a process of adding a text message as described for step S43 and step S44 in FIG. 5, for example.

That is, by performing the process of blurring a video image, for example, the dissatisfaction of the user can be reduced as compared to a case where no video information is displayed or a blackout of the screen suddenly occurs.

Furthermore, by presenting the time until playback of the video information starts (restarts) as a text message in a counting-down manner, for example, the user can know how long the user needs to wait, and thus the dissatisfaction of the user can be relieved.

Thus, the control unit 23 performs, as the process of controlling the processing process, a process of generating designation information designating a processing process to be performed and blockage prediction period information or blockage prediction period information as control information and supplying it to the control information-wireless communication unit 22 to cause the control information to be sent to the HMD 12.

The control information-wireless communication unit 22 sends a wireless signal based on the control information supplied from the control unit 23 to the HMD 12 by using the antenna 21. The low transmission rate communication by the control information-wireless communication unit 22 is less prone to cause transmission error or the like than the high transmission rate communication with high directivity.

The control information such as the designation information and the blockage prediction period information sent to the HMD 12 in this manner can be regarded as control information instructing the processing process on the video information.

For example, when the control unit 23 generates the designation information, the control unit 23 selects one processing process or a combination of some processing processes as the processing process to be performed from a plurality of processing processes on the basis of the communication path blockage prediction table. Besides, a predetermined processing process may be determined as the processing process to be performed.

The process of step S83 is performed in a case where the process of step S82 is performed, a case where it is determined in step S81 that the blockage period is short, a case where it is determined in step S79 that the condition of the communication path is good, or a case where it is determined in step S73 that the communication path being used will not be blocked.

In step S83, the control unit 23 determines whether or not the communication path is switched.

For example, in step S83, it is determined that the switching is performed in a case where the process of the step S78 is performed to switch the communication path in the past and the communication path after the switching is being used at the present point of time.

In a case where it is determined in step S83 that the switching is not performed, the process of step S84 is not performed, and the communication control process ends.

In contrast, in a case where it is determined in step S83 that the switching is performed, the console 11 in step S84 performs a communication path recovery process, and the communication control process ends.

Note that in the communication path recovery process, the details of which will be described later, the communication path to be used is appropriately switched from the communication path being used at the present point of time to the communication path used before switching to that communication path.

For example, the communication path is switched in step S78 because the communication path being used at that time will be blocked in the future or is already blocked at the present point of time, and the switching is performed to a communication path with a better communication condition. However, if blockage does not occur, it is often the case that the communication path before the switching essentially has a better communication condition than the communication path after the switching.

Thus, in the communication path recovery process, the communication path conditions of the communication path being used at the present point of time and the communication path before the switching to that communication path are compared to determine whether or not to perform recovery of the communication path on the basis of the feedback information, the BF training result, and the communication path blockage prediction table.

Specifically, in a case where the communication path before the switching is not blocked at the present point of time and condition of the communication path before the switching is better than the condition of the communication path being used at the present point of time, for example, it is determined to perform recovery of the communication path, that is, switch the communication path to the communication path before the switching. Then, the communication path is appropriately switched according to the determination result.

In the above-described manner, the console 11 regularly or irregularly updates the communication path blockage prediction table to predict blockage of the communication path, and performs control of switching the communication path, control of the encoding, control of the processing process, and control of recovering the communication path according to the prediction result. In this manner, the lowering in the quality of user experience can be suppressed.

<Description of Communication Path Mapping Process and Estimation Process>

Next, each process performed in the communication control process described with reference to FIG. 8 will be describe in more detail.

First, the communication path mapping process corresponding to step S71 in FIG. 8 will be described.

For example, in order for the console 11 to predict blockage of the communication path by an obstacle, the actual communication route, that is, the direction (propagation route) in which radio waves as a wireless signal actually propagate and the movement direction (movement line) of the obstacle need to be identified.

Here, the movement speed and the movement direction of the obstacle can be obtained from surrounding environment images at a plurality of mutually different times obtained by the camera 29, but the propagation direction of the radio waves as the wireless signal sent from the console 11 at a high transmission rate needs to be visualized. In the communication path mapping process performed in step S71 in FIG. 8, such visualization of the propagation direction of the radio waves is performed.

The communication path mapping process corresponding to the process of step S71 in FIG. 8 and performed by the console 11 and an estimation process performed by the HMD 12 in response to the communication path mapping process will be described below with reference to the flowchart of FIG. 9.

In step S111, the wireless communication unit 27 sends training data for BF training from the antenna 28 in accordance with control of the control unit 23.

For example, in step S111, the wireless communication unit 27 sends the training data on some communication paths that are candidates for the communication path to be used and include the communication path currently used. Furthermore, this training data may also be used for BF training for sending video information (code information) using the 60-GHz band or the like.

When the training data is sent, the estimation process is started in the HMD 12.

That is, in step S141, the wireless communication unit 62 receives the training data sent from the console 11 by using the antenna 61, and supplies it to the control unit 67.

In step S142, the control unit 67 estimates the arrival angle of the training data on the basis of reception conditions such as the timing of receiving the training data in step S141, and generates arrival angle information indicating the estimation result.

Here, the arrival angle of the training data refers to an angle $\varphi_R$ at which the training data arrives at the HMD 12 with respect to the front direction of the HMD 12, for example, and to the angle formed by the arrival direction of the wireless signal as the training data and the front direction seen from the HMD 12.

For example, the antenna 61 includes a plurality of antennas, and the control unit 67 estimates the arrival angle φR of the training data by the Multiple Signal Classification (MUSIC) method or the like on the basis of the timing of receiving the training data at those antennas or the like. Note that the arrival angle information is generated for each communication path in which the training data is sent.

In step S143, the control unit 67 estimates a rotation angle $\varphi_H$, which is the direction that the HMD 12 faces relative to a predetermined reference direction, on the basis of the position and attitude information supplied from the inertia measuring unit 68, and generates rotation angle information indicating the estimation result. In other words, the rotation angle information can be regarded as information indicating the orientation of the HMD 12 relative to the console 11.

For example, the reference direction here is the direction connecting the console 11 and the HMD 12 or the like, and the angle formed by that reference direction and the front direction of the HMD 12 is regarded as the rotation angle φH.

When the arrival angle information and the rotation angle information are thus obtained, the control unit 67 supplies the arrival angle information and the rotation angle information to the control information-wireless communication unit 70 as control information that is a response to the training data, and instructs sending it to the console 11.

In step S144, the control information-wireless communication unit 70 sends, to the console 11, the arrival angle information and the rotation angle information supplied from the control unit 67 by using the antenna 71, and the estimation process ends.

Note that the arrival angle information and the rotation angle information may be sent by the wireless communication unit 62 at a high transmission rate. Furthermore, in step S144, a received power, SINR or the like may be sent to the console 11 as a response to the training data received in step S141 for each communication path.

When the process of step S144 is performed, the process of step S112 is performed in the console 11.

That is, in step S112, the control information-wireless communication unit 22 receives the arrival angle information and the rotation angle information sent from the HMD 12, and supplies them to the control unit 23.

In step S113, the control unit 23 acquires, from the wireless communication unit 27, emission angle information indicating an emission angle $\varphi_T$ of the training data sent in the step S111.

The emission angle $\varphi_T$ is the angle formed by a predetermined reference direction such as the direction connecting the console 11 and the HMD 12 and the propagation direction of the training data sent as a wireless signal when being sent, that is, immediately after being sent.

In step S114, the control unit 23 acquires a surrounding environment image from the camera 29.

In step S115, the control unit 23 maps propagation routes, that is, communication paths of the training data sent in step S111 onto the surrounding environment image acquired in step S114 on the basis of the arrival angle information, the rotation angle information, and the emission angle information.

Figure 10:
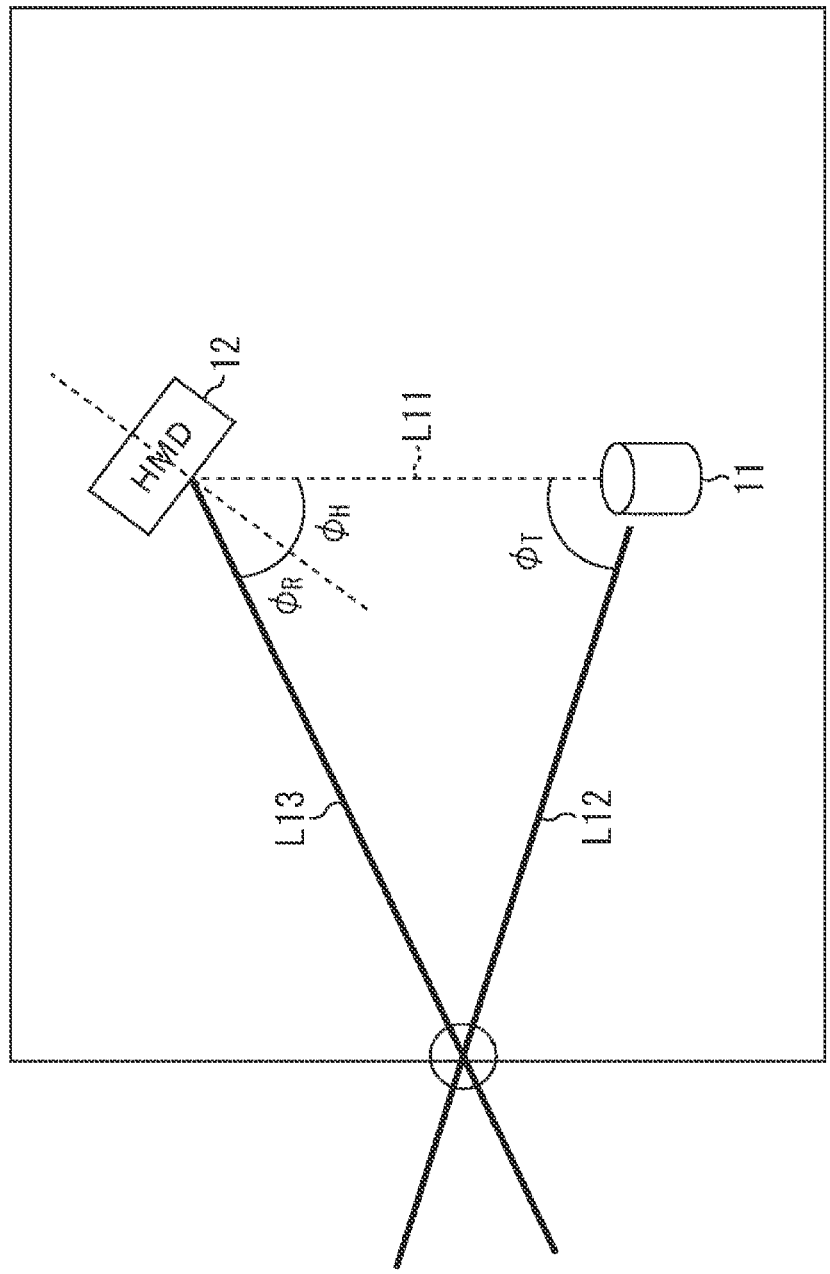
FIG. 10 is a diagram illustrating mapping of communication paths.

Specifically, it is assumed that the console 11 and the HMD 12 are in a real space with the positional relationship shown in FIG. 10, for example. Note that, although the description here is made by using a plan view for simplicity of description, in actuality the communication path mapping is performed three-dimensionally on the basis of horizontal angles and vertical angles with respect to the surrounding environment image.

In the example of FIG. 10, the console 11 is located diagonally left and forward of the HMD 12. The control unit 23 of the console 11 sets the direction of a straight line L11 connecting the console 11 and the HMD 12 as the reference direction, for example.

Then, the control unit 23 draws, onto the surrounding environment image, a straight line L12 extending in the direction of the emission angle $\varphi_T$ indicated by the emission angle information with respect to the reference direction indicated by the straight line L11 from the console 11 as the starting point.

Next, the control unit 23 draws, onto the surrounding environment image, a straight line L13 extending in the direction of the angle $(\varphi_R + \varphi_H)$ obtained by adding the arrival angle $\varphi_R$ indicated by the arrival angle information and the rotation angle $\varphi_H$ indicated by the rotation angle information with respect to the reference direction indicated by the straight line L11 from the HMD 12 as the starting point.

Then, the control unit 23 obtains the communication path of the training data on the basis of the intersecting point (intersection) between these straight lines L12 and L13 and the position of a nearby wall obtained from the surrounding environment image or the like, and draws the communication path finally obtained on the surrounding environment image. In other words, the propagation route of the training data when the communication path is used is mapped onto the surrounding environment image. More specifically, the communication path is mapped on data representing a three-dimensional real space. In this manner, the communication path is visualized.

Note that the communication path mapping is performed for each of a plurality of communication paths in which the training data is sent. Hereinafter, information indicating each communication path, that is, propagation route (communication route) obtained by mapping the communication path is referred to as communication path mapping information.

Besides, at the time of the communication path mapping, some allowance may be given to the arrival angle $\varphi_R$ and the rotation angle $\varphi_H$ so that the communication route can be obtained in consideration of the beam width of the wireless signal sent as the training data.

Figure 8:
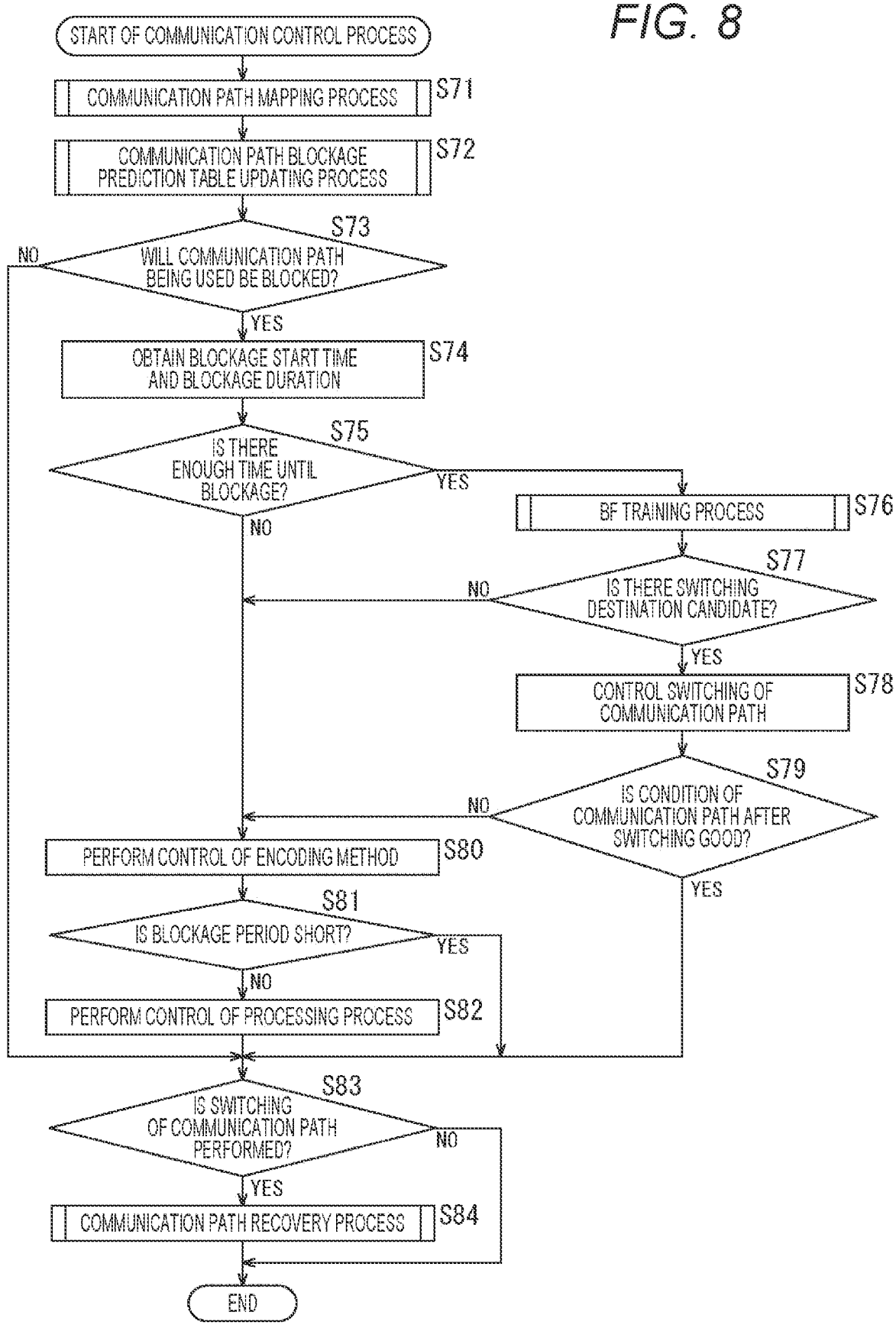
FIG. 8 is a flowchart illustrating a communication control process.
Figure 9:
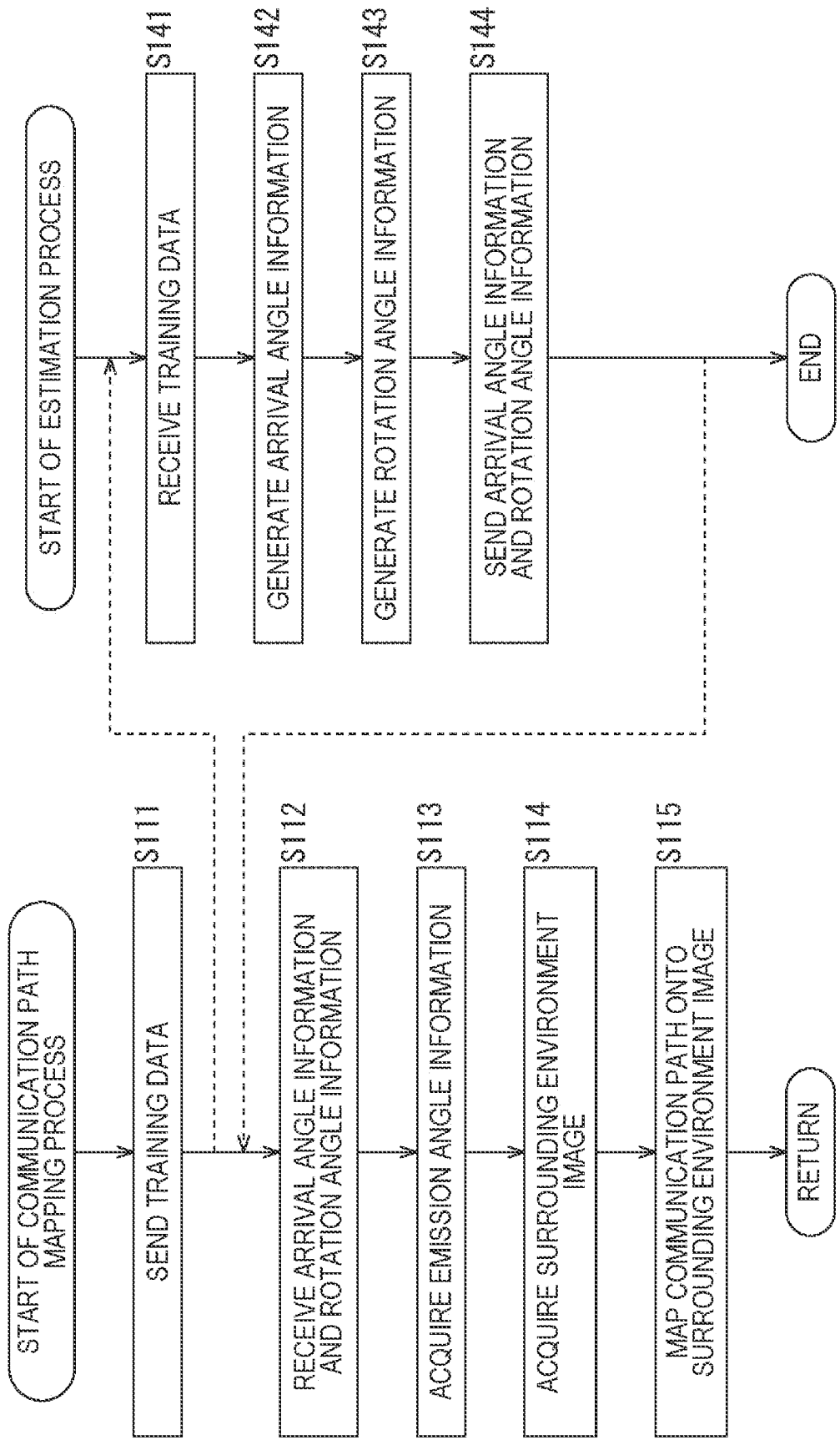
FIG. 9 is a flowchart illustrating a communication path mapping process and an estimation process.

When the communication path mapping information is thus obtained, the communication path mapping process of FIG. 9 ends, and the process then proceeds to step S72 in FIG. 8.

In the above-described manner, the HMD 12 receives training data from the console 11, generates the arrival angle information and the rotation angle information in response to the reception, and sends them to the console 11. Furthermore, the console 11 receives the arrival angle information and the rotation angle information from the HMD 12, and performs the communication path mapping.

In this manner, the console 11, when sending wireless signals on a plurality of communication paths, can identify through which route those wireless signals reach the HMD 12.

Note that the communication path mapping process and the estimation process described with reference to FIG. 9 may be performed at the time of initial setting of the console 11 and the HMD 12, or may be performed regularly or irregularly at a desired timing.

<Description of Communication Path Blockage Prediction Table Updating Process>

When the communication path mapping process described with reference to FIG. 9 is performed, the communication path blockage prediction table updating process is performed as described with reference to FIG. 8.

The communication path blockage prediction table updating process corresponding to step S72 in FIG. 8 and performed by the console 11 will be described below with reference to the flowchart of FIG. 11.

In step S171, the control unit 23 calculates the movement line of an obstacle around the console 11, more specifically an obstacle that blocks the communication path to the HMD 12, on the basis of surrounding environment images at a plurality of mutually different times supplied from the camera 29.

For example, the control unit 23 obtains the difference between a plurality of surrounding environment images and performs image recognition on the surrounding environment images to detect a moving object as an obstacle from the surrounding environment images. Moreover, the control unit 23 obtains the motion vector of the obstacle or the like to obtain the movement line of the obstacle, that is, the movement direction and the movement speed of the obstacle by calculation.

Figure 12:
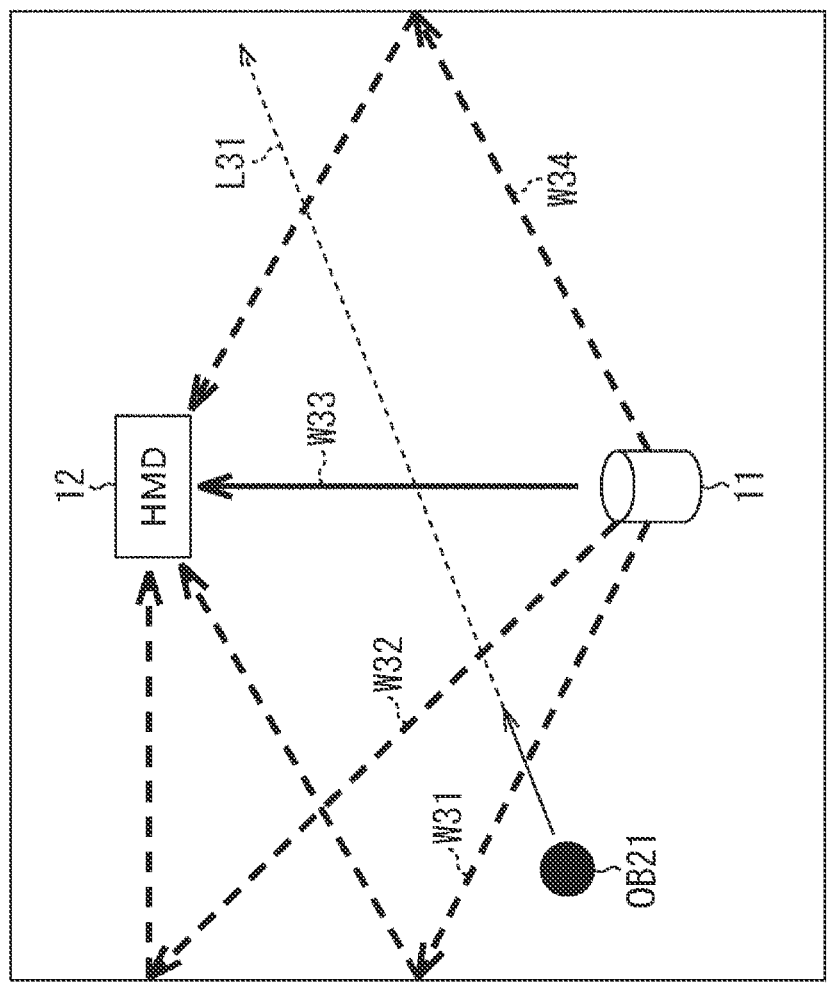
FIG. 12 is a diagram illustrating update of a communication path blockage prediction table.

As an example, it is assumed here that, as shown in FIG. 12, there are communication paths A to D represented by arrows W31 to W34, respectively as communication paths between the console 11 and the HMD 12 indicated by the communication path mapping information, for example.

In this example, it is assumed that an obstacle OB21 is detected from a surrounding environment image and the movement line represented by an arrowed straight line L31 is obtained as the movement line of the obstacle OB21.

In this case, it can be predicted that the communication paths A to D will be blocked in succession at mutually different future timings on the basis of the obtained movement line of the obstacle OB21 and the communication paths A to D indicated by the communication path mapping information.

In particular, in the example shown in FIG. 12, it is assumed that the communication path C is being used for transmitting the video information at the present point of time, and the switching destination communication path is selected from the remaining communication paths A, B, and D in switching the communication path.

Figure 11:
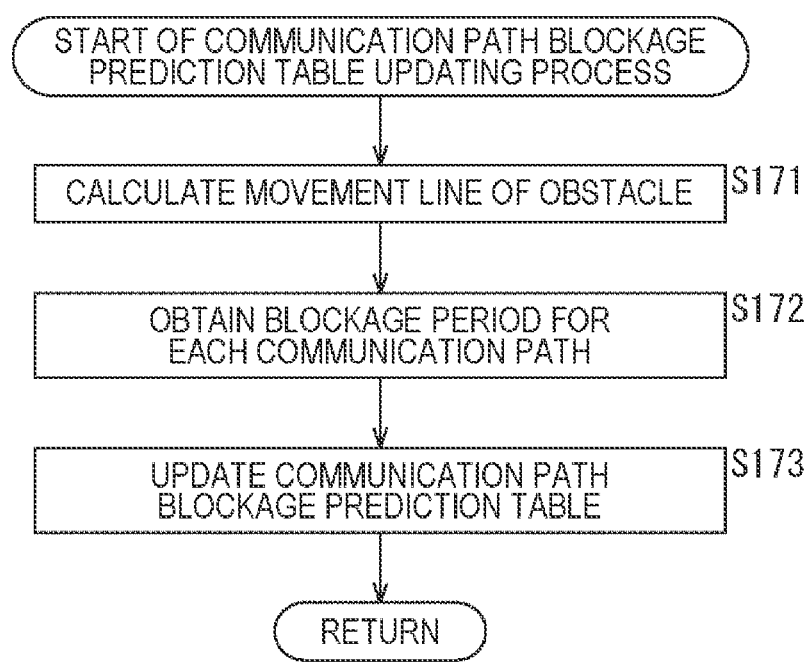
FIG. 11 is a flowchart illustrating a communication path blockage prediction table updating process.

Returning to description of the flowchart of FIG. 11, in step S172, the control unit 23 obtains the blockage period in which each communication path is blocked on the basis of the communication path mapping information obtained in step S71 in FIG. 8 and the movement line of the obstacle obtained in step S171.

For example, in the example shown in FIG. 12, the control unit 23 can identify (predict) how long and from what time the communication path A is blocked by the obstacle OB21 on the basis of the communication path mapping information, that is, the communication path A mapped onto the surrounding environment image and the movement line of the obstacle OB21, that is, the movement direction and the movement speed of the obstacle OB21. In other words, the blockage period identified by the blockage start time and the blockage duration for the communication path A can be obtained. Similarly, the blockage period can be obtained for each of the other communication paths B to D.

Returning to description of FIG. 11, in step S173, the control unit 23 updates the communication path blockage prediction table being retained on the basis of the blockage period of each communication path obtained in step S172.

For example, in a case where the communication paths A to D shown in FIG. 12 are present and the movement line represented by the straight line L31 in FIG. 12 is obtained, in step S173, a communication path blockage prediction table shown in FIG. 13 is obtained as an updated communication path blockage prediction table.

In the example shown in FIG. 13, a table in which 1-bit flag information indicating whether or not a communication path is blocked at each of predetermined times $t_1$ to $t_8$ as reference points is arranged for the four communication paths A to D is used as the communication path blockage prediction table.

Here, each reference point represents a time after a predetermined amount of time. For example, time $t_1$ represents the time after $t_1$ seconds from the present time.

Furthermore, each field represents flag information indicating whether or not a corresponding communication path is in a blocked state at a corresponding time. In particular, a field containing a circle represents that the value of the flag information is a value indicating a blocked state, and a field containing no circle (blank) represents that the value of the flag information is a value indicating a non-blocked state.

Therefore, regarding the communication path A, for example, it can be seen that the communication path A is in the blocked state at times $t_1$ to $t_3$ and is in the non-blocked state at subsequent times $t_4$ to $t_8$.

Note that, although an example in which the eight times $t_1$ to $t_8$ are set as reference points is described here, the number of reference points and time intervals between adjacent reference points may be set in any manner.

Furthermore, the blockage prediction period information is not limited to the communication path blockage prediction table, and may be information in any other form such as information indicating from how many seconds later to how many seconds later with respect to the present time each communication path is blocked, for example.

Returning to description of the flowchart of FIG. 11, the control unit 23 after updating the communication path blockage prediction table, appropriately supplies the updated communication path blockage prediction table to the wireless communication unit 27 and the encoder unit 26, and the communication path blockage prediction table updating process ends. When the communication path blockage prediction table updating process ends, the process then proceeds to step S73 in FIG. 8.

Note that the supplying of the communication path blockage prediction table to the wireless communication unit 27 and the like may be regularly performed regardless of whether or not the communication path blockage prediction table is updated, or may be performed every time the communication path blockage prediction table is updated.

In the above-described manner, the console 11 updates the communication path blockage prediction table on the basis of the surrounding environment images and the communication path mapping information. In this manner, it is possible to predict how long and at which timing each communication path is blocked from the communication path blockage prediction table.

The communication path blockage prediction table thus obtained is used for processes such as processes of step S73, step S74, step S75, and step S81 described above.

For example, in a case where the communication path blockage prediction table shown in FIG. 13 is obtained, it is possible to identify that the communication path C being used is blocked during a time period from time $t_4$ to time $t_5$ in step S73. Furthermore, in step S74, time $t_4$ is the blockage start time, and the time from time $t_4$ to time $t_5$ is the blockage duration.

Moreover, in step S75, it is determined whether or not the time until the blockage of the communication path C being used is started, that is, the time from time $t_1$ to immediately before time $t_4$ is greater than or equal to a predetermined threshold.

Note that, in a case where the communication path blockage prediction table is supplied from the control unit 23 to the wireless communication unit 27, processes such as of steps S73 to S79, step S81, and step S83 in FIG. 8 described above may be performed by the wireless communication unit 27. In such a case, it is sufficient that the determination result or the like in each step is supplied from the wireless communication unit 27 to the control unit 23 as needed.

<Description of BF Training Process>

Next, the BF training process corresponding to step S76 in FIG. 8 will be described. That is, the BF training process corresponding to step S76 in FIG. 8 and performed by the console 11 will be described below with reference to the flowchart of FIG. 14.

In step S201, the wireless communication unit 27 selects one communication path that is not selected yet and is other than the communication path being used from communication paths indicated by the communication path blockage prediction table supplied from the control unit 23. Note that the communication path selected in step S201 is hereinafter also referred to as a selected communication path.

In step S202, the wireless communication unit 27 determines whether or not the selected communication path selected in step S201 will be blocked during the BF training period in a case where the BF training is to be performed in the future on the basis of the communication path blockage prediction table.

In a case where it is determined in step S202 that the selected communication path will be blocked, the process proceeds to step S205. In this case, since BF training cannot be appropriately performed on the selected communication path and the selected communication path cannot be used as the switching destination communication path, this selected communication path is not targeted for the BF training.

In contrast, in a case where it is determined in step S202 that the blockage will not occur, the wireless communication unit 27 in step S203 determines whether or not the selected communication path will be blocked during the same time period as the communication path being used on the basis of the communication path blockage prediction table.

Here, it is determined that the communication path being used and the selected communication path will be blocked during the same time period in a case where the selected communication path is also blocked at a timing when the communication path being used is blocked, that is, a case where the blockage period of the communication path being used and at least part of the blockage period of the selected communication path overlap even if the blockage period of the communication path being used and the blockage period of the selected communication path are not exactly the same.

In a case where it is determined in step S203 that the selected communication path will be blocked during the same time period as the communication path being used, the process proceeds to step S205. In this case, the selected communication path will be blocked during the same time period as the communication path being used, and thus is not appropriate to use as the switching destination instead of the communication path being used, and therefore is not targeted for the BF training.

On the other hand, in a case where it is determined in step S203 that the selected communication path will not be blocked during the same time period as the communication path being used, the wireless communication unit 27 in step S204 targets the selected communication path for the BF training.

The process of step S205 is performed in a case where the process of step S204 is performed, it is determined in step S203 that they will be blocked during the same time period, or it is determined in step S202 that the blockage will occur.

In step S205, the wireless communication unit 27 determines whether or not all of the communication paths indicated by the communication path blockage prediction table and other than the communication path being used are processed as selected communication paths.

In a case where it is determined in step S205 that not all of the communication paths are processed, the process returns to step S201, and the above-described process is repeatedly performed.

In contrast, in a case where it is determined in step S205 that all of the communication paths are processed, the wireless communication unit 27 in step S206 performs BF training for the communication paths targeted for the BF training in step S204.

That is, for each of the communication paths targeted for BF training, the wireless communication unit 27 sends training data for the BF training by the antenna 28 using the targeted communication path.

Furthermore, a response signal in which received power, SINR, and the like of each communication path are included as needed is sent from the HMD 12 in response to the sending of the training data, and thus the wireless communication unit 27 receives the response signal by the antenna 28.

When the wireless communication unit 27 receives the response signal, the BF training is completed, and wireless communication is enabled on communication paths for which the BF training is performed.

Note that, in a case where there is no communication path targeted for BF training, the process of step S206 is not performed. In this case, since there is no communication path as a switching destination candidate, it is determined in step S77 in FIG. 8 that there is no switching destination candidate.

When the process of step S206 is performed, the BF training process ends, and the process then proceeds to step S77 in FIG. 8.

In the above-described manner, the console 11 performs BF training only for communication paths that satisfy a predetermined condition among the communication paths indicated by the communication path blockage prediction table.

In this manner, BF training is not performed on unnecessary communication paths, and thus it is possible to reduce the processing load of the BF training accordingly and complete the BF training more quickly.

Here, a specific example of selecting communication paths targeted for BF training will be described.

For example, it is assumed that the communication path blockage prediction table shown in FIG. 13 is obtained and the communication path currently used is the communication path C.

Figure 15:
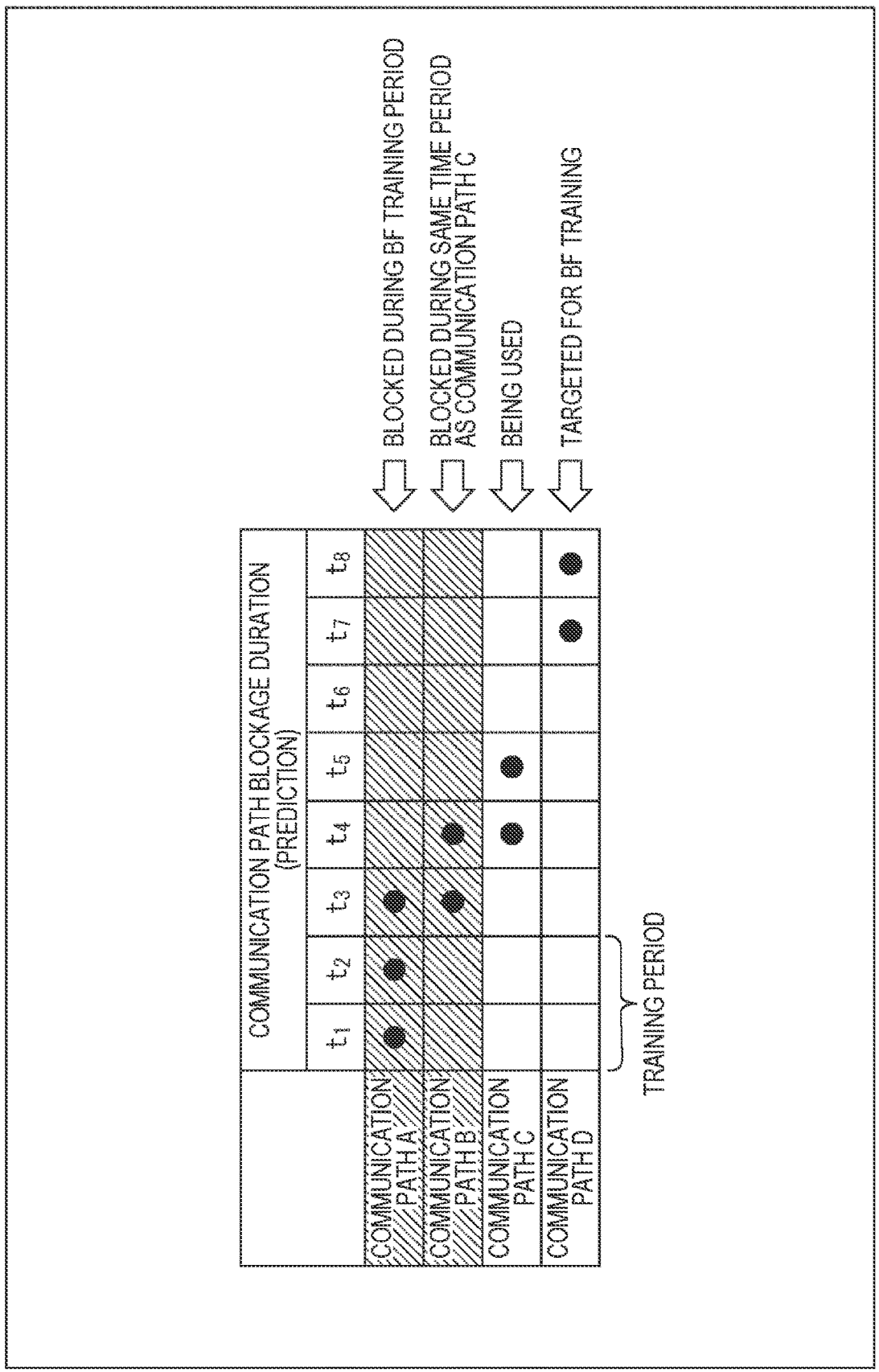
FIG. 15 is a diagram illustrating BF training.

Furthermore, for example, it is assumed that the time period from time $t_1$ to time $t_2$, that is, the time period from time $t_1$ to immediately before time $t_3$ is needed to perform BF training as shown in FIG. 15.

Figure 14:
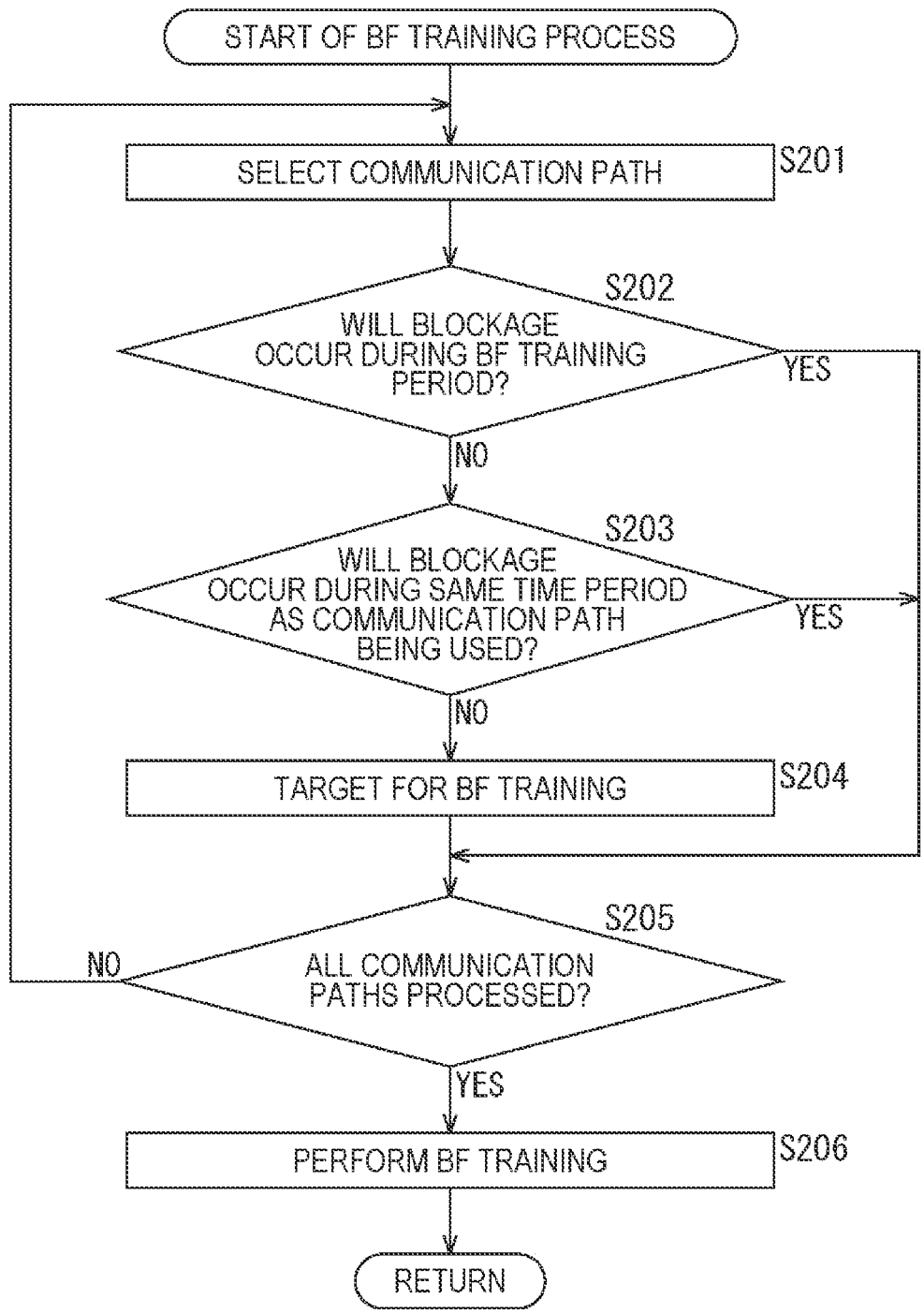
FIG. 14 is a flowchart illustrating a BF training process.

In a case where the BF training process described with reference to FIG. 14 is performed in such a state, the wireless communication unit 27 performs the process on the communication path A, the communication path B, and the communication path D, other than the communication path C being used, as selected communication paths in succession.

At this time, regarding the communication path A, the communication path A is blocked during the BF training period and thus is excluded from the targets for BF training. That is, in step S202, it is determined that the communication path A will be blocked during the BF training period.

Next, regarding the communication path B, since blockage occurs at time $t_4$, which is the same time as the blockage period of the communication path C being used, it is determined in step S203 that they are blocked during the same time period (timing), and the communication path B is also excluded from the targets for BF training.

Moreover, regarding the communication path D, it is not blocked during the BF training period and also not blocked during the blockage period of the communication path C being used, and thus the communication path D is targeted for BF training.

Therefore, in the example shown in FIG. 15, BF training is performed only on the communication path D. In other words, the communication path D is the only candidate for switching destination of the communication path C currently used.

Note that, although a case where there are four communication paths is described here for simplicity of description, in actuality the number of communication paths may be 100 or more at the maximum.

Therefore, in a case where there are a particularly large number of communication paths, the time for performing BF training can be significantly reduced by performing the BF training process described with reference to FIG. 14 to narrow down the communication paths targeted for BF training.

<Control of Encoding Method>

As described for the communication control process in FIG. 8, in a case where blockage of the communication path being used is predicted but there is not enough time until the blockage, a case where there is no communication path as a switching destination candidate, or a case where the condition of the communication path after switching is not good, control of the encoding method is performed in step S80 in order to suppress the lowering in the quality of user experience.

For example, in a case where it is predicted that the communication path being used will be blocked and there is not enough time to perform BF training until the blockage is started, frame loss of video information being transmitted may occur when the communication path is in a blocked state. In that case, the possibility that the video information cannot be correctly decoded on the HMD 12 side is increased, causing lowering in the quality of user experience due to temporal interruption of the playback of the video information or the like.

Thus, in step S80 in FIG. 8, the encoding method is changed such that the effect of the frame loss or the like on the user experience can be minimized.

In this case, the control unit 23 may directly designate the time period in which the encoding method is changed and the encoding method after the change for the encoder unit 26 on the basis of the communication path blockage prediction table. Otherwise, the encoder unit 26 may determine the time period in which the encoding method is changed and the encoding method after the change on the basis of the communication path blockage prediction table from the control unit 23 or the like.

Figure 16:
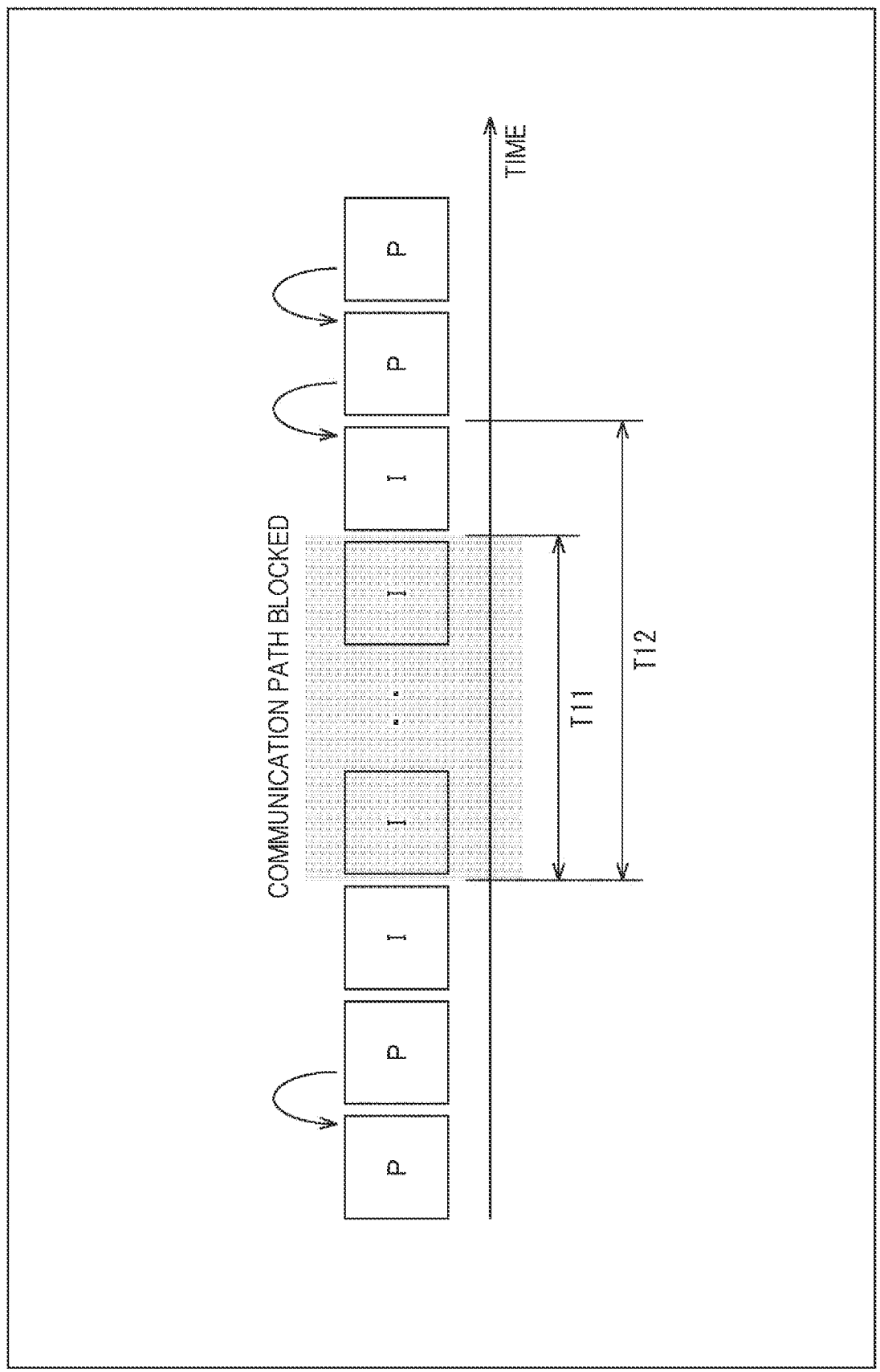
FIG. 16 is a diagram illustrating an example of controlling an encoding method.
Figure 17:
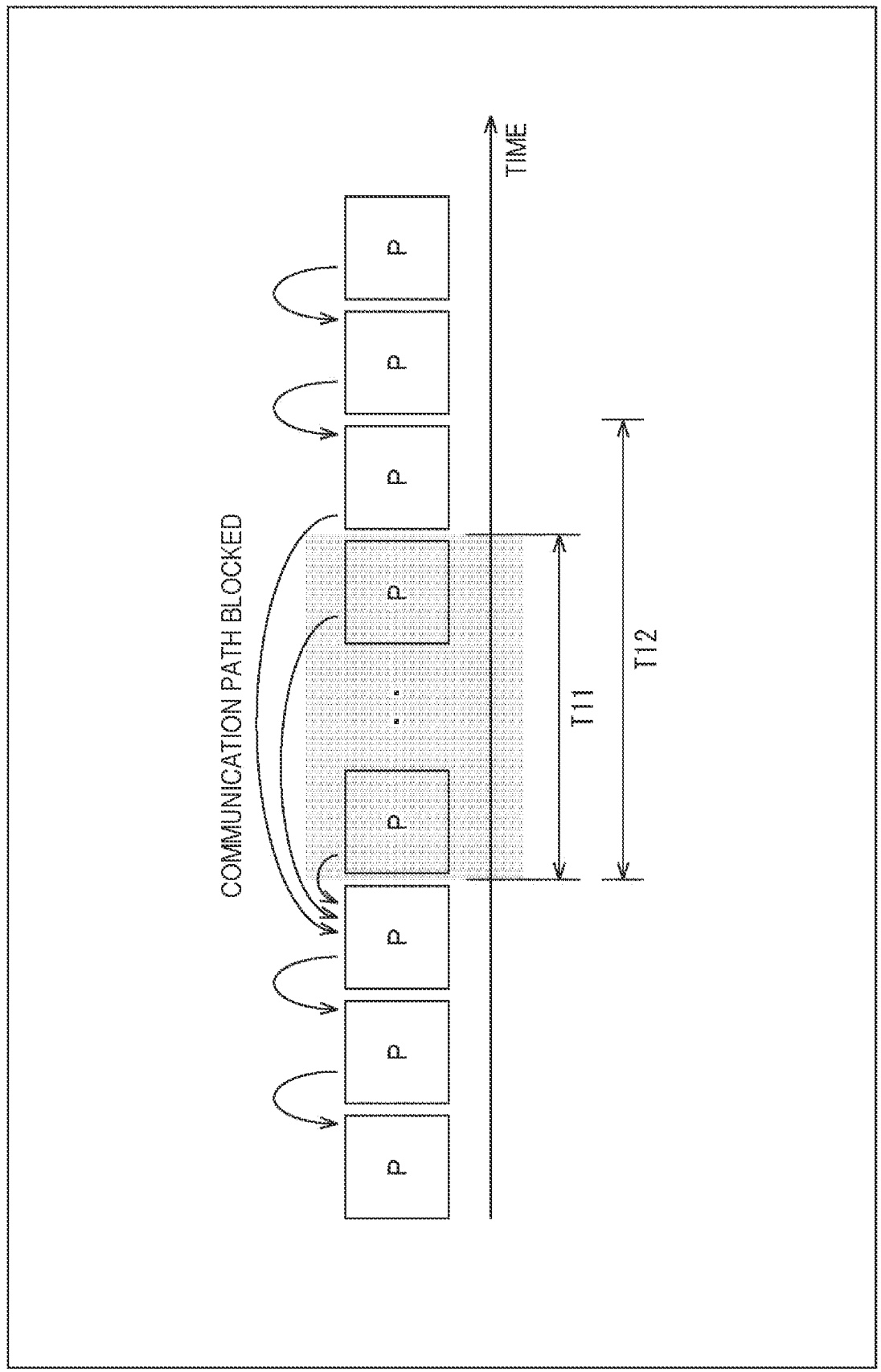
FIG. 17 is a diagram illustrating an example of controlling an encoding method.

As specific examples, the examples shown in FIGS. 16 and 17 are possible, for example.

Note that the horizontal direction in FIGS. 16 and 17 indicates time, and each rectangle in the figures represents one frame, that is, picture of the video information. In particular, a rectangle marked with the letter "I" represents an I picture, and a rectangle marked with the letter "P" represents a P picture. Furthermore, an arrow from a P picture toward another picture in FIGS. 16 and 17 represents a reference target of the P picture when decoded.

For example, in the example shown in FIG. 16, a frame of the video information is encoded as an I picture at least during a time period in which the communication path being used is blocked.

An I picture is a frame (picture) encoded by using intra-frame encoding, that is, intra-frame prediction (intra prediction), and the I picture can be correctly obtained by decoding code information as long as the code information of the frame can be correctly received.

In contrast, a P picture is a frame (picture) encoded by using unidirectional prediction, that references a certain point, that is, a picture (frame) prior in time, more specifically inter-frame prediction (inter prediction). The P picture cannot be correctly obtained by decoding unless not only code information of the frame but also code information of the reference target frame can be correctly received.

For example, in the example shown in FIG. 16, to decode the second P picture from the left side in the figure, both code information of the P picture and code information of the P picture at the left end in the figure as a reference target picture are needed.

Here, it is assumed that an encoding method in which encoding of video information is performed by appropriately selecting a P picture or an I picture for each frame is adopted as a normal encoding method, for example. That is, it is assumed that an encoding method in which an I picture and a P picture are always included during a certain time period is adopted.

Furthermore, it is assumed that it is predicted from the communication path blockage prediction table that the communication path currently used will be blocked during a time period T11.

In this case, the possibility that frames of the video information (code information) are not correctly transmitted is increased during the time period T11 in which the communication path is blocked. That is, the possibility of frame loss is increased.

Therefore, if P pictures continue to be transmitted during the time period T11, frame loss of even one frame can cause an event where subsequent frames whose reference target is lost cannot be correctly decoded. In other words, even if frame loss of only one frame occurs, correct decoding may be impossible during a time period of a plurality of frames due to the effect thereof.

Thus, in step S80 in FIG. 8, control is performed such that encoding is performed by an encoding method in which all frames (pictures) of the video information are encoded as I pictures during a time period T12, which at least includes the entire time period T11 in which the communication path is blocked. That is, the encoding method is changed.

In the example shown in FIG. 16, the time period from the frame at which the blockage is started to the frame immediately after the blockage ends, that is, the time period from the frame at which the time period T11 starts to the frame immediately after the time period T11 ends is the time period T12.

In addition, an encoding method different from that of normal times is selected during this time period T12, and the frames in the time period T12 are all I pictures.

Note that the time period T11 can be identified from the communication path blockage prediction table. Furthermore, the time period T12 may be determined in any manner as long as at least part of the time period T11 is included, and the time period T11 itself may be the time period T12, for example.

By performing the encoding such that the frames in the time period T12 are all I pictures, even if loss of one frame occurs during the blockage period of the communication path, frames of the video information can be correctly obtained by decoding on the HMD 12 side after the frame at which the frame loss occurs as long as the subsequent frames can be correctly transmitted. That is, it is possible to minimize the effect of the frame loss.

In the example of FIG. 16, since all frames are I pictures during the time period T12, the code length of the code information is increased, but the deterioration in the video quality is less prone to occur because another picture is not referenced during the decoding.

Furthermore, the encoding method shown in FIG. 17 is also considered as an encoding method different from that of normal times. Note that portions in FIG. 17 that correspond to those of the case of FIG. 16 are given the same reference characters, and descriptions thereof will be omitted as appropriate.

In the example of FIG. 17, encoding is performed by an encoding technique different from that of normal times during the time period T12 including the time period T11 in which the blockage of the communication path occurs.

Specifically, encoding is performed such that the frames of the video information are all P pictures during the time period T12. At this time, the reference target of a P picture is always a picture (P picture or I picture) outside the time period T11. In FIG. 17, the reference targets of all P pictures in the time period T12 are P pictures prior in time to the time period T11.

For example, it is assumed that, in the normal encoding method, the reference target of a P picture is a picture immediately before the P picture. In this case, if frame loss of a P picture occurs at a certain timing, a P picture whose reference target is the P picture cannot be correctly obtained as well.

In contrast, a P picture that is the reference target of a P picture in the time period T12 is transmitted at a timing before the blockage of the communication path occurs, and thus the possibility that frame loss of the P picture as the reference target occurs is low.

Therefore, in the example in FIG. 17, if the code information of a frame (P picture) can be correctly received during the time period T12, the frame can be correctly decoded, as in the example shown in FIG. 16. Furthermore, even if the frame is lost, the inability to correctly decode other frames due to an effect of the frame is eliminated. In this manner, it is possible to minimize the effect of the frame loss.

In particular, in this example, since all are encoded as P pictures during the blockage period, the code length of the code information can be reduced as compared to the example shown in FIG. 16.

However, in this example, if the blockage period is long, the difference from the reference target picture is increased, and thus quality deterioration and increase in code length may be caused. Therefore, the encoding method shown in FIG. 17 is particularly effective in a case where the time period in which the communication path is blocked (blockage duration) is short.

Note that, although an example in which the pictures in the time period T12 are all P pictures is described in FIG. 17, I pictures may be included in the time period T12 as long as the reference targets of the P pictures in the time period T12 are all pictures before the time period T11.

Besides, a picture in the time period T12 may be encoded as a picture that references a picture posterior in time to itself, such as a B picture, as its reference target, and in such a case, it is sufficient that the reference target picture of that picture is a picture outside the time period T11.

Moreover, in step S80 in FIG. 8, the encoding method shown in FIG. 16 may be always selected, or the encoding method shown in FIG. 17 may be always selected, but one of those encoding methods may be selectively adopted.

In such a case, the control unit 23 or the encoder unit 26 may perform encoding using the encoding method shown in FIG. 17 when the blockage duration, that is, the length of the blockage period of the communication path is less than or equal to a predetermined length, and perform encoding using the encoding method shown in FIG. 16 when the blockage duration is longer than the predetermined length, for example.

<Control of Processing Process>

Moreover, as described for the communication control process of FIG. 8, in a case where the blockage period is long, a processing process is performed on a video image, that is, video information presented to the user.

For example, the processing process is performed for purposes such as notifying the user that the communication path is going to be blocked, that the communication path is blocked and how much time is needed until recovery, or the like, or preventing a sudden blackout of the screen due to frame loss or the like.

Here, a specific example of the processing process will be described with reference to FIG. 18.

Figure 18:
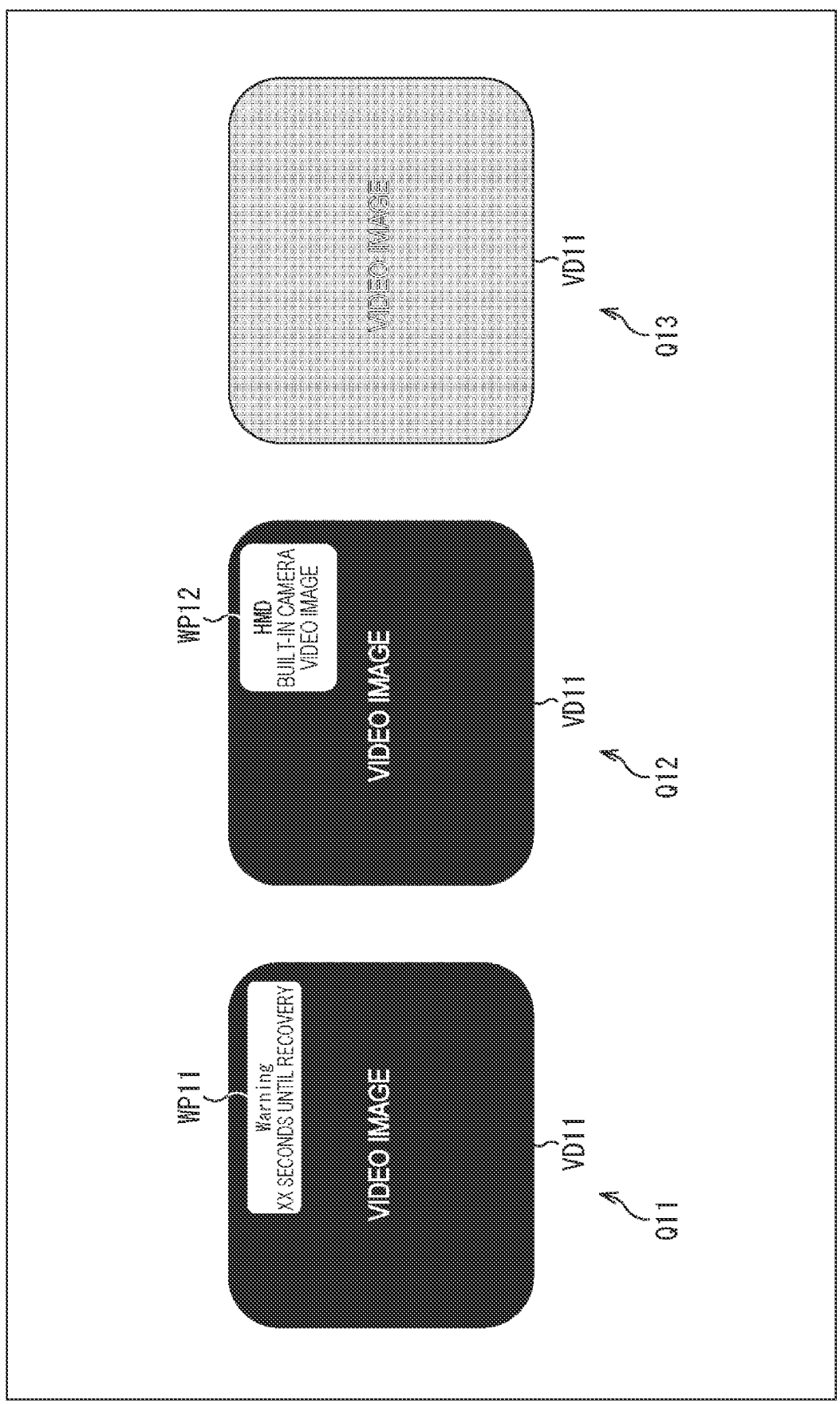
FIG. 18 is a diagram illustrating an example of a processing process.

For example, in the example indicated by arrow Q11 in FIG. 18, a display region WP11 of "Warning" is provided on the upper-right corner in the figure of a video image VD11 based on the video information, and the time from the state where the playback is stopped (suspended) due to frame loss of the video information until the playback is restarted, that is, the time until recovery is displayed as a text message in the portion of the display region WP11. That is, the text message is displayed in a superimposed manner on the video image VD11.

In this example, a text message of "Warning XX Seconds Until Recovery" is displayed in the portion of the display region WP11 so that the remaining time until recovery is presented to the user.

Therefore, by performing a processing process of displaying such a text message or the like in a superimposed manner, that is, adding a text message to the video information, it is possible to relieve the dissatisfaction of the user and thereby suppress the lowering in the quality of user experience.

Furthermore, in a case where the HMD 12 has a built-in camera, for example, a processing process may be performed in which a captured image whose subject is a surrounding scene of the HMD 12 is captured by the camera and the obtained captured image is displayed in a superimposed manner as a picture-in-picture image in the portion of the display region WP12 provided at the upper-right corner of the video image VD11 in the figure as indicated by arrow Q12.

In the example indicated by arrow Q12, a partial region of the video image VD11 is the display region WP12, and the picture-in-picture image is displayed in the portion of the display region WP12. Note that the image displayed in the portion of the display region WP12 may be the entire captured image, or may be a partial region of the captured image.

By displaying the captured image as a picture-in-picture image in this manner, the user wearing the HMD 12 can recognize an obstacle traversing in front of him/her or the like, and thus it is possible to notify the user that the communication path is going to be blocked or the communication path is in the blocked state.

In particular, in a case where the update (playback) of the video information is going to stop for a long time or the like, if the captured image can be presented to the user to convey surrounding conditions, it is possible to relieve dissatisfaction (stress) of the user and suppress the lowering in the quality of user experience.

Moreover, when the communication path is blocked and the video image based on the video information stops being updated, that is, the playback is unintentionally stopped, for example, a blackout of the display screen may suddenly occur. In such a case, the user may be dissatisfied.

Thus, for example, a processing process may be performed such as gradually blurring the video image VD11 displayed immediately before the playback is stopped as indicated by arrow Q13, that is, the video image VD11 displayed immediately before the frame loss occurs. Thus, it is possible to reduce the dissatisfaction of the user as compared to a case where the display screen is suddenly blacked out, and as a result, the lowering in the quality of user experience can be suppressed.

As the control performed in step S82 in FIG. 8, any of the processing process of adding the text message indicated by arrow Q11, the processing process of displaying the captured image in a superimposed manner indicated by arrow Q12, and the processing process of gradually blurring the video image indicated by arrow Q13 may be performed, or some of those processes may be performed in combination.

Furthermore, a predetermined processing process may be performed, or what processing process is to be performed may be selected on the basis of the blockage prediction period information. Moreover, as described above, the selection of the processing process may be performed on the console 11 side, or may be performed on the HMD 12 side.

For example, in a case where the selection of the processing process is performed on the console 11 side, the control unit 23 in step S82 in FIG. 8 selects the processing process to be performed on the basis of the blockage prediction period information (communication path blockage prediction table), and supplies the designation information indicating the selected processing process and the blockage prediction period information to the control information-wireless communication unit 22 as control information and causes them to be sent to the HMD 12.

Thus, the control unit 23 controls the control information-wireless communication unit 22 to send the control information to the HMD 12 to control the processing process on the video information on the HMD 12 side. In this case, the control information sent to the HMD 12 can be regarded as control information instructing the processing process.

On the other hand, the processing process to be performed can be selected on the HMD 12 side.

In such a case, the control unit 23 in step S82 in FIG. 8 supplies the blockage prediction period information to the control information-wireless communication unit 22 as the control information instructing the processing process and causes it to be sent to the HMD 12 to control the processing process on the video information on the HMD 12 side.

Figure 19:
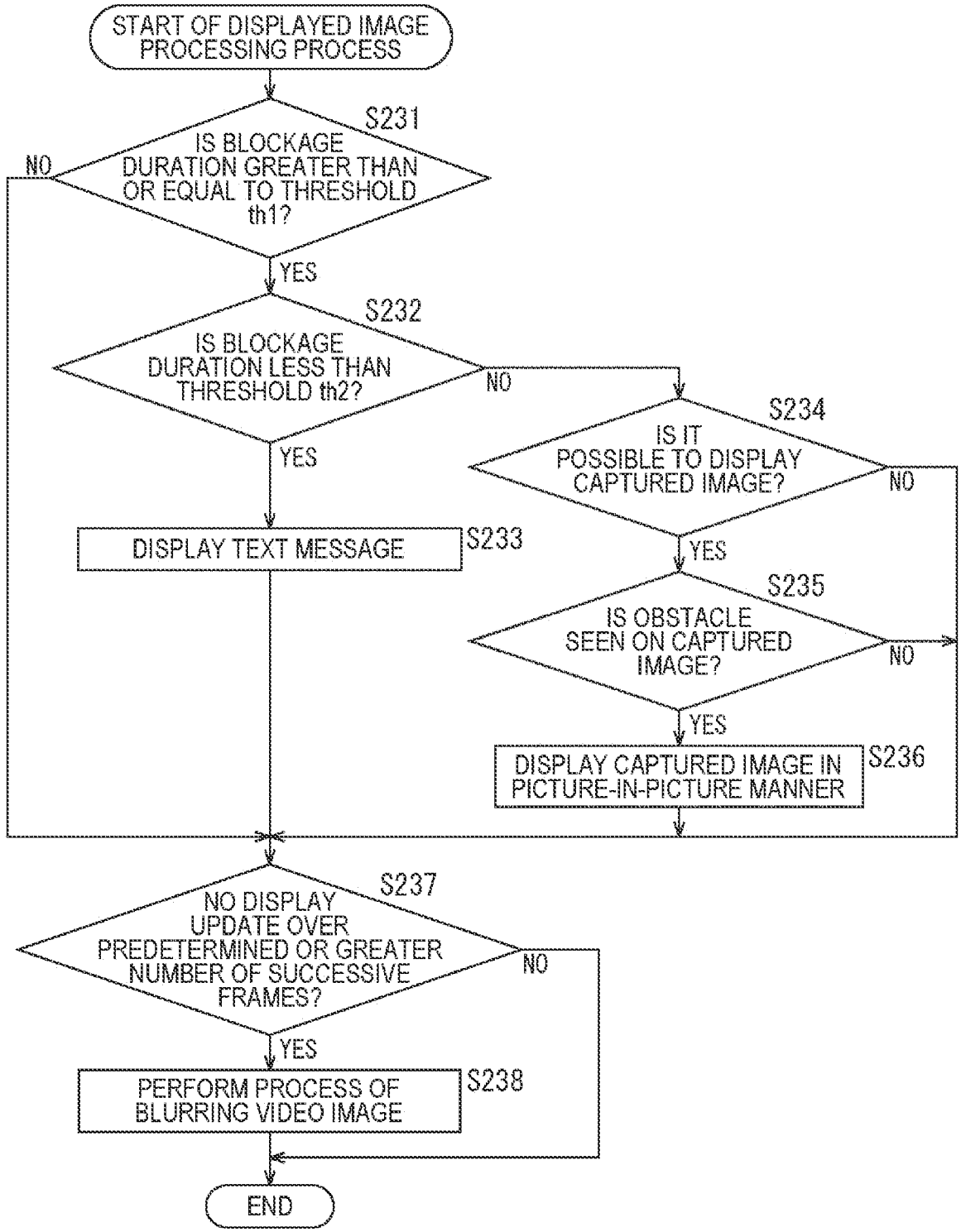
FIG. 19 is a flowchart illustrating a displayed video image processing process.

In this case, a displayed video image processing process shown in FIG. 19 is performed in the HMD 12, for example. The displayed video image processing process performed by the HMD 12 will be described below with reference to the flowchart of FIG. 19.

Note that this displayed video image processing process corresponds to the processes of steps S43 and S44 in FIG. 5, and is started when the control information-wireless communication unit 70 receives the blockage prediction period information as the control information sent from the console 11 and supplies it to the control unit 67.

In step S231, the control unit 67 determines whether or not the blockage duration of the communication path being used is greater than or equal to a predetermined threshold th1 on the basis of the blockage prediction period information supplied from the control information-wireless communication unit 70. For example, the threshold th1 is determined in seconds. Furthermore, the threshold th1 may be set by the user.

In a case where it is determined in step S231 that the blockage duration is not greater than or equal to the threshold th1, that is, the time in which the communication path is blocked is short and there is little effect on the video information, the processes of steps S232 to S236 are not performed, and the process then proceeds to step S237.

In contrast, in a case where it is determined in step S231 that it is greater than or equal to the threshold th1, the control unit 67 in step S232 determines whether or not the blockage duration of the communication path being used is less than a predetermined threshold th2 on the basis of the blockage prediction period information.

Here, the threshold th2 is set to a time (number of seconds) longer than the threshold th1, and the threshold th2 is set to a time such that, even when the time until recovery of the video image is presented to the user as a text message and the user sees the time until recovery, the user does not unpleasantly feel that it is long, for example.

In a case where it is determined in step S232 that it is less than the threshold th2, that is, there is some effect on the playback of the video information due to blockage of the communication path but the duration of the effect is not so long, the process proceeds to step S233.

In step S233, the control unit 67 controls the processing process by the video image generating unit 64 to display a text message in a superimposed manner on the video image based on the video information.

For example, the control units 67 notifies the video image generating unit 64 of the time until recovery of the video image on the basis of the blockage prediction period information, and instructs it to perform the processing process on the video information.

The video image generating unit 64 performs the processing process of adding the text message to the video information supplied from the decoder unit 63 on the basis of the time until recovery notified from the control unit 67, and supplies the processed video information thereby obtained to the storage unit 65.

In this case, the video image generating unit 64 generates video information in which the time until recovery as a text message is superimposed on the video image based on the video information and displayed in a counting-down manner as the processed video information, for example. In this manner, in the video image displaying unit 66, the video image indicated by arrow Q11 in FIG. 18 is displayed, for example.

Thus, in a case where the blockage duration of the communication path is short to some extent, the time until recovery is presented to the user, and the lowering in the quality of user experience is suppressed. When the process of step S233 is performed, the process then proceeds to step S237.

On the other hand, in a case where it is determined in step S232 that it is not less than the threshold th2, the control unit 67 in step S234 determines whether or not it is possible to display a captured image.

For example, in step S234, in a case where the HMD 12 has a camera capable of capturing the captured image whose subject is a surrounding scene and can capture a captured image by using the camera, it is determined that it is possible to display the captured image.

In a case where it is determined in step S234 that it is not possible to display the captured image, the process then proceeds to step S237.

In contrast, in a case where it is determined in step S234 that it is possible to display the captured image, the control unit 67 in step S235 determines whether or not an obstacle is seen on the captured image, that is, whether or not there is an obstacle that causes blockage of the communication path between the HMD 12 and the console 11 on the basis of the captured image supplied from the camera. Here, the obstacle is detected by image recognition on the captured image, a process of obtaining the difference between a plurality of captured images, or the like, for example.

In a case where it is determined in step S235 that the obstacle is not seen, the process then proceeds to step S237.

On the other hand, in a case where it is determined in step S235 that the obstacle is seen, the control unit 67 in step S236 controls the processing process by the video image generating unit 64 to display the captured image on the video image based on the video information in a picture-in-picture manner.

For example, the control unit 67 supplies the captured image supplied from the camera to the video image generating unit 64 and instructs it to perform the processing process on the video information.

The video image generating unit 64 performs the processing process of displaying the captured image in a superimposed manner on the video information supplied from the decoder unit 63 as a picture-in-picture image on the basis of the captured image supplied from the control unit 67, and supplies the processed video information thereby obtained to the storage unit 65.

In this case, in the video image displaying unit 66, the video image indicated by arrow Q12 in FIG. 18 is displayed, for example. Thus, in a case where the blockage time of the communication path is long to some extent, the lowering in the quality of user experience can be suppressed by presenting surrounding conditions to the user.

In particular, the user can recognize that there is an obstacle in surroundings when the captured image is displayed in a picture-in-picture manner, and if the user moves such that the communication path is not blocked, the time until recovery of the video image is shortened. When the process of step S236 is performed, the process then proceeds to step S237.

In a case where it is determined in step S231 that it is not greater than or equal to the threshold th1, the process of step S233 is performed, it is determined in step S234 that it is not possible to display it, it is determined in step S235 that the obstacle is not seen, or the process of step S236 is performed, the process of the step S237 is then performed.

In step S237, the control unit 67 determines whether or not display of the video information is not updated over a predetermined or greater number of successive frames on the basis of the reception condition of the video information in the wireless communication unit 62. In other words, it is determined whether or not frames of the video information cannot be obtained over a predetermined or greater number of successive frames due to frame loss or transmission delay or the like.

In a case where it is not determined in step S237 that the display is not updated over the predetermined or greater number of successive frames, the process of step S238 is not performed, and the displayed video image processing process ends.

In contrast, in a case where it is determined in step S237 that the display is not updated over the predetermined or greater number of successive frames, the process then proceeds to step S238.

In step S238, the control unit 67 controls the video image generating unit 64 to perform the process of gradually blurring the video image based on the video information as a processing process on the video information.

The video image generating unit 64 performs the processing process of gradually blurring the video image on the video information supplied from the decoder unit 63 in accordance with control of the control unit 67, and supplies the processed video information thereby obtained to the storage unit 65.

At this time, as indicated by arrow Q13 in FIG. 18, the same frame of the video information finally received is used, and the video image of the frame is gradually blurred, for example.

In particular, in a case where step S233 or step S236 is performed, the video image in which the text message or the picture-in-picture image is displayed and gradually blurred is obtained in step S238.

Thus, in a case where the display of the video information is not updated over the predetermined or greater number of successive frames due to frame loss or the like, the processing process is performed such that the video image presented to the user is gradually blurred regardless of whether or not the text message is displayed in step S233 or the picture-in-picture display is performed in step S236. In this manner, it is possible to prevent a sudden change in display such as blackout and suppress the lowering in the quality of user experience.

When the process of step S238 is performed, the displayed video image processing process then ends.

In the above-described manner, the HMD 12 appropriately selects an appropriate processing process on the basis of the blockage prediction period information and the reception condition of the video information, and performs the selected processing process on the video information. In this manner, it is possible to perform processing according to the situation on the video image and suppress the lowering in the quality of user experience.

<Description of Communication Path Recovery Process>

Moreover, recovery of the communication path will be described.

For example, in the example described with reference to FIG. 15, it is assumed that, when the communication path C is being used, BF training is performed only on the communication path D in step S206 in FIG. 14, and the communication path is then switched to the communication path D in step S78 in FIG. 8.

Typically, as shown in FIG. 12, when the communication path is switched from the communication path C having an unobstructed route, that is, a route connecting the console 11 and the HMD 12 with a straight line to the communication path A, the communication path B, or the communication path D having a reflection route in which radio waves (electromagnetic waves) are reflected by a wall or the like, the received power on the HMD 12 side is lowered and there is a possibility that the communication environment is deteriorated.

However, even if the communication condition of the communication path C is improved after the communication environment (communication condition) of the communication path C worsens and the communication path is switched to one of the other communication paths A, B, and D, the switching of the communication path is not necessarily performed immediately. For example, even in a case where BF training is regularly performed, it may be necessary to wait for the start of the next BF training depending on the intervals. On the other hand, in a case where BF training is not regularly performed, the switching of the communication path is not performed until the communication path being used at that point of time is blocked.

Therefore, the BF training is not immediately performed even when the blockage of the communication path C ends, and the communication condition of the communication path C cannot be grasped, and thus communication may be continued on a communication path that is not optimal.

On the other hand, in the communication control process described with reference to FIG. 8, in step S84, a communication path recovery process is performed to appropriately switch the communication path to be used to the initial communication path.

Figure 20:
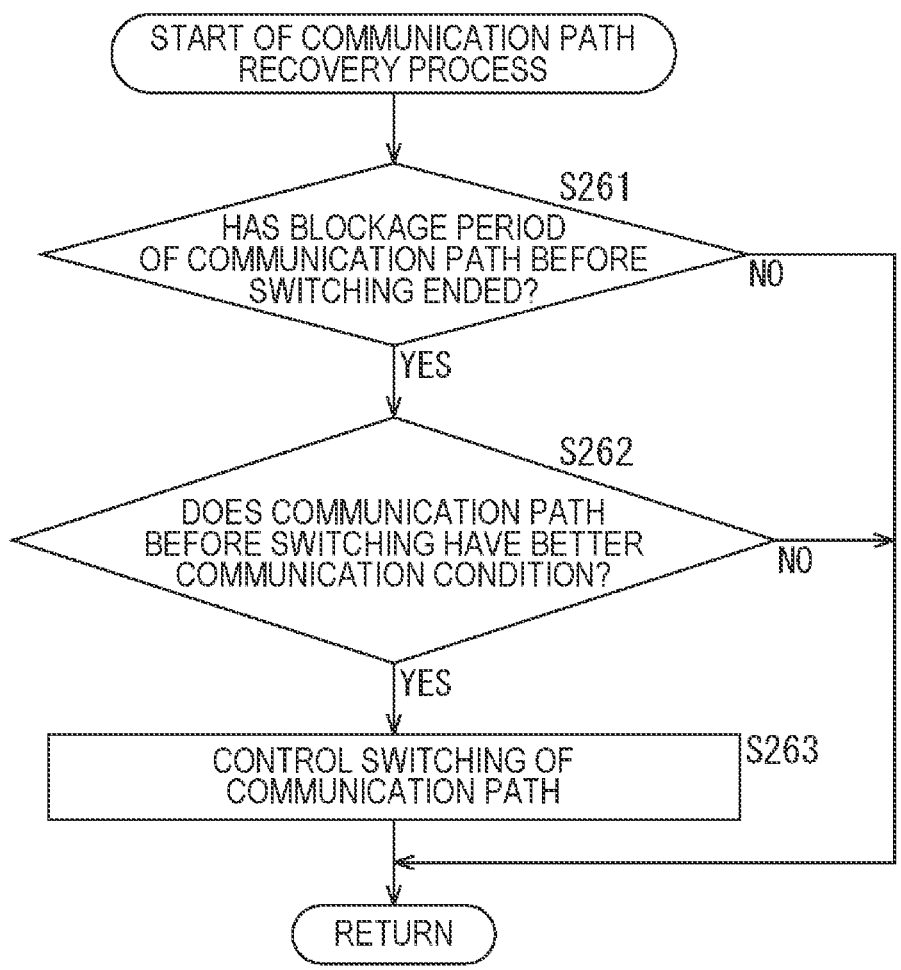
FIG. 20 is a flowchart illustrating a communication path recovery process.

Here, the process of step S84 in FIG. 8 will be described in detail. That is, the communication path recovery process corresponding to step S84 in FIG. 8 and performed by the console 11 will be described below with reference to the flowchart of FIG. 20.

In step S261, the control unit 23 determines whether or not the blockage period of the communication path before the switching has ended on the basis of the communication path blockage prediction table.

For example, the control unit 23 can identify the time when the blockage period of the communication path ends from the communication path blockage prediction table, and can set the time until recovery to the communication path before the switching is performed after the switching of the communication path on the basis of the identification result. Thus, the end of the blockage period may be determined in step S261 when the set time has elapsed, for example.

In a case where it is determined in step S261 that the blockage period has not ended yet, the communication path recovery process ends because it is unnecessary to switch the communication path, and thus the communication control process of FIG. 8 also ends.

In contrast, in a case where it is determined in step S261 that the blockage period has ended, the control unit 23 in step S262 determines whether or not the communication path before the switching has a better communication condition than the communication path being used.

For example, in the example shown in FIG. 15, it is assumed that switching from the communication path C to the communication path D is performed and the communication path D is being used at the present point of time.

In this case, regarding the communication path C initially used before the switching, the control unit 23 can grasp the communication condition of the communication path C in the state where no blockage occurs from a previous BF training result or feedback information. Similarly, the control unit 23 can grasp the communication condition of the communication path D currently used.

Thus, the control unit 23 determines that the communication path C before the switching has a better communication condition in step S262 in a case where the communication condition of the communication path D being used and the communication condition of the communication path C before the switching are compared and the communication path C has a better communication condition than the communication path D. At this time, the comparison is made with respect to received power, SINR, or the like as an index representing the communication condition, for example.

In a case where it is determined in step S262 that the communication path being used has a better communication condition than the communication path before the switching, that is, it is not determined that the communication path before the switching has a better communication condition, the communication path recovery process ends because it is unnecessary to switch the communication path, and thus the communication control process of FIG. 8 also ends.

On the other hand, in a case where it is determined in step S262 that the communication path before the switching has a better communication condition, the process proceeds to step S263.

In step S263, the control unit 23 controls the switching of the communication path. In this manner, the recovery to the communication path before the switching is achieved.

For example, the control unit 23 instructs the wireless communication unit 27 to switch the communication path such that wireless communication using the communication path before the switching is performed.

Then, the wireless communication unit 27 switches the communication path used for sending a wireless signal to the HMD 12 to the communication path designated from the control unit 23 in response to the instruction from the control unit 23.

Thus, in step S14 in FIG. 4 performed after that, the communication path before the switching becomes a new communication path being used, and the communication path is used to send a wireless signal based on the video information to the HMD 12, for example. That is, electromagnetic waves based on the wireless signal are radiated from the antenna 28 in the direction of the switched communication path.

Note that BF training may be performed on the switching destination communication path immediately before the switching of the communication path in step S263. Furthermore, the processes of steps S261 to S263 may be performed by the wireless communication unit 27.

When the process of step S263 is performed and the communication path is switched, the communication path recovery process ends, and thus the communication control process of FIG. 8 also ends.

In the above-described manner, the console 11 switches the communication path to the communication path before the switching in a case where after the switching of the communication path is performed, the blockage period of the communication path before the switching ends and the communication path before the switching has a better condition than the communication path after the switching.

In this manner, a communication path with a better communication condition can be used for communication, and thus it is possible to suppress deterioration in the video quality and the occurrence of transmission delay due to frame loss and suppress the lowering in the quality of user experience.

Moreover, in this case, since BF training is already completed for the communication path before the switching, recovery to the communication path before the switching can be quickly performed without performing BF training at the time of the switching. Note that a signal for making a notification of switching the communication path may be sent to the HMD 12 before the switching of the communication path.

As described above, according to the content playback system to which the present technology is applied, it is possible to predict in advance that the communication path being used will be blocked, and rapidly and efficiently switch the communication path on the basis of the blockage start time and the blockage duration.

In this manner, it is possible to prevent significant deterioration of the communication environment (communication condition) and suppress the lowering in the quality of user experience.

Furthermore, even in a case where the switching of the communication path cannot be performed or the condition of the communication path after the switching is not good, control of the encoding method is performed to reduce the effect of frame loss or control of the processing process on the video information is performed to relieve dissatisfaction (stress) of the user.

In the content playback system, the lowering in the quality of user experience, that is, lowering in the value of VR experience can be suppressed by those control operations.

<Example Configuration of Computer>

Incidentally, the series of processes described above can be performed by hardware or software. In a case where the series of processes is performed by software, programs constituting the software are installed on a computer. Here, the computer includes computer incorporated in dedicated hardware, a general-purpose personal computer or the like, for example, capable of performing various functions by installing various programs.

Figure 21:
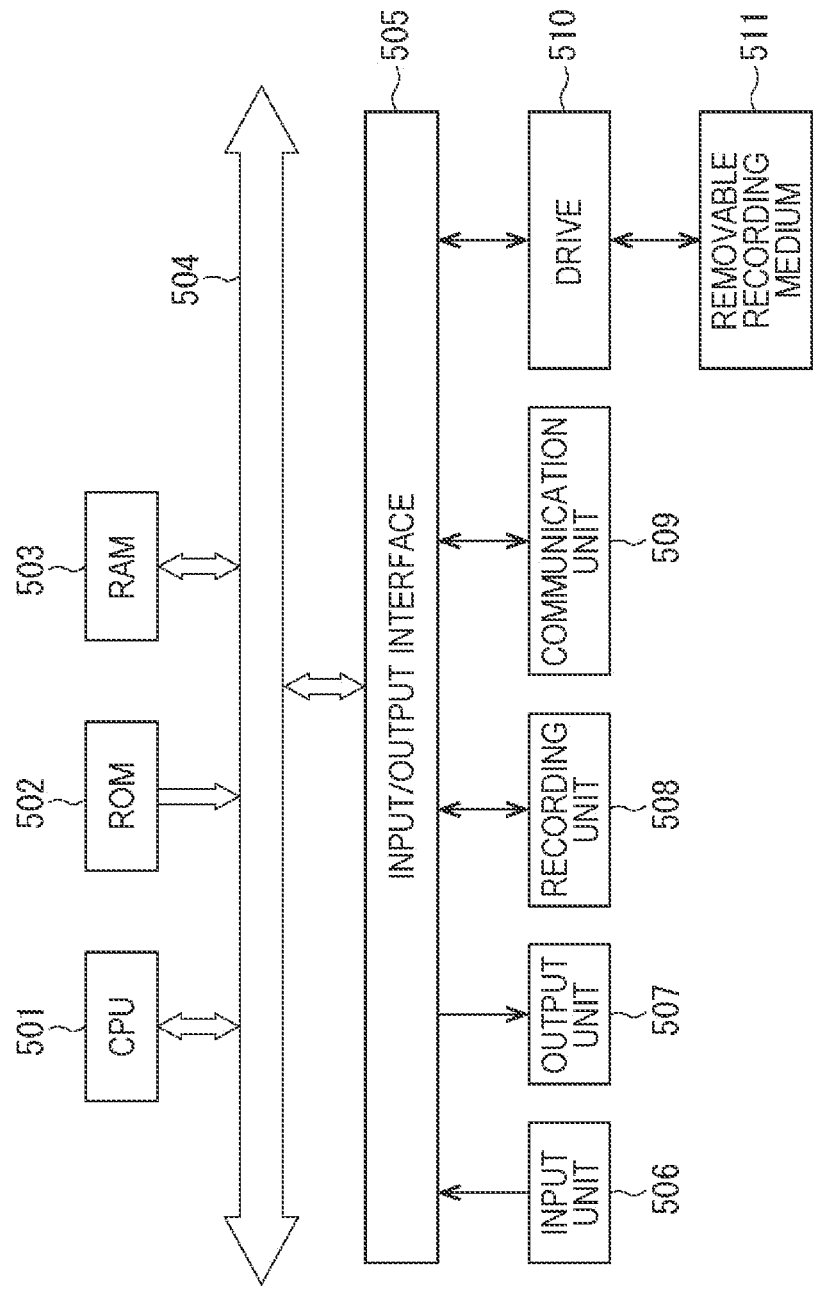
FIG. 21 is a diagram showing an example configuration of a computer.

FIG. 21 is a block diagram showing an example configuration of hardware of a computer that performs the series of processes described above by means of programs.

In the computer, a Central Processing Unit (CPU) 501, a Read Only Memory (ROM) 502, and a Random Access Memory (RAM) 503 are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, an image capturing device, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511 such as a magnetic disk, an optical disk, a magneto-optical disk, or a semiconductor memory.

In the computer configured in the above-described manner, the CPU 501 loads and executes programs recorded in the recording unit 508 on the RAM 503 via the input/output interface 505 and the bus 504, so that the series of processes described above is performed, for example. The CPU 501 may be a processor such as a microprocessor or a processing circuit.

The programs executed by the computer (CPU 501) can be provided by being recorded in the removable recording medium 511 as a package medium or the like, for example. Furthermore, the programs can be provided via a wired or wireless transmission medium such as a local area network, the Internet, or digital satellite broadcast.

In the computer, the programs can be installed on the recording unit 508 via the input/output interface 505 by mounting the removable recording medium 511 to the drive 510. Furthermore, the programs can be received by the communication unit 509 and installed on the recording unit 508 via a wired or wireless transmission medium. Besides, the programs can be installed in advance on the ROM 502 or the recording unit 508.

Note that the programs executed by the computer may be programs in which processes are performed on a time-series basis in the order described in this specification, or may be programs in which processes are performed in parallel or at necessary timings such as when being called.

Furthermore, the embodiment of the present technology is not limited to the above-described embodiment, and various changes are possible without departing from the spirit of the present technology.

For example, the present technology can take a form of cloud computing in which one function is jointly and cooperatively processed by a plurality of devices via a network.

Furthermore, each step described in the above-described flowcharts can be jointly performed by a plurality of devices as well as by one device.

Moreover, in a case where one step includes a plurality of processes, the plurality of processes included in the one step can be jointly performed by a plurality of devices as well as by one device.

Moreover, the present technology can be configured as follows.

(1)

An information processing device including:

a wireless communication unit that sends transmission information to another information processing device through wireless communication; and a control unit that controls at least one of the wireless communication performed by the wireless communication unit, encoding of the transmission information, or a processing process on the transmission information on the basis of blockage prediction period information indicating a prediction result on blockage of a communication path to the another information processing device.

(2)

The information processing device according to (1), in which the control unit generates the blockage prediction period information on the basis of a movement line of an obstacle between the information processing device and the another information processing device and of a propagation route when the communication path is used.

(3)

The information processing device according to (2), in which the control unit obtains the movement line on the basis of surrounding environment images at mutually different times, the surrounding environment images containing the another information processing device as a subject.

(4)

The information processing device according to (2) or (3), in which the control unit obtains the propagation route on the basis of arrival angle information received from the another information processing device and indicating an angle of arrival of a signal sent from the wireless communication unit at the another information processing device and of rotation angle information indicating orientation of the another information processing device.

(5)

The information processing device according to any one of (2) to (4), in which the control unit generates the blockage prediction period information for a plurality of the communication paths including the communication path being used for sending the transmission information.

(6)

The information processing device according to any one of (1) to (5), in which the blockage prediction period information is information indicating a blockage start time of the communication path and a blockage duration for which the communication path is blocked.

(7)

The information processing device according to any one of (1) to (6), in which the control unit controls switching of the communication path used for sending the transmission information on the basis of the blockage prediction period information.

(8)

The information processing device according to (7), in which in a case where blockage of the communication path being used is predicted, the control unit causes training to be performed for one or more communication paths excluding the communication path to be blocked during a training period and causes the communication path used for sending the transmission information to be switched to one of the communication paths for which the training is performed on the basis of the blockage prediction period information.

(9)

The information processing device according to (7) or (8), in which in a case where blockage of the communication path being used is predicted, the control unit causes training to be performed for one or more communication paths excluding the communication path to be blocked at a same timing as the communication path being used and causes the communication path used for sending the transmission information to be switched to one of the communication paths for which the training is performed on the basis of the blockage prediction period information.

(10)

The information processing device according to any one of (7) to (9), in which in a case where the communication path used for sending the transmission information is switched from a predetermined communication path to another communication path, the control unit causes the communication path used for sending the transmission information to be switched from the another communication path to the predetermined communication path after a blockage period of the predetermined communication path ends.

(11)

The information processing device according to any one of (1) to (10), in which the control unit causes an encoding method for the transmission information to be changed on the basis of the blockage prediction period information.

(12)

The information processing device according to (11), in which the control unit causes an encoding method in a period including a blockage period of the communication path being used to be changed to an encoding method in which a picture in video information as the transmission information is encoded as an I picture.

(13)

The information processing device according to (11), in which the control unit causes an encoding method in a period including a blockage period of the communication path being used to be changed to an encoding method in which a picture that is in video information as the transmission information and references another picture is encoded as a picture whose reference target is a picture outside the blockage period.

(14)

The information processing device according to any one of (1) to (13), in which the control unit generates control information instructing the processing process on video information as the transmission information, and causes the control information to be sent to the another information processing device.

(15)

An information processing method performed by an information processing device, including:

sending transmission information to another information processing device through wireless communication; and controlling at least one of the wireless communication performed by a wireless communication unit, encoding of the transmission information, or a processing process on the transmission information on the basis of blockage prediction period information indicating a prediction result on blockage of a communication path to the another information processing device.

(16)

An information processing device including:

a wireless communication unit that receives video information sent from another information processing device through wireless communication; and a control unit that controls a processing process on the video information on the basis of blockage prediction period information indicating a prediction result on blockage of a communication path to the another information processing device.

(17)

The information processing device according to (16), in which the blockage prediction period information is received from the another information processing device.

(18)

The information processing device according to (16) or (17), in which the control unit selects one or more processing processes from a plurality of the processing processes on the basis of the blockage prediction period information, and causes the selected processing processes to be performed.

(19)

The information processing device according to any one of (16) to (18), in which the processing process is a process of blurring a video image based on the video information, a process of adding a text message to the video image, or a process of displaying a captured image whose subject is a surrounding scene of the information processing device in a partial region of the video image.

(20)

An information processing method performed by an information processing device, including:

receiving video information sent from another information processing device through wireless communication; and controlling a processing process on the video information on the basis of blockage prediction period information indicating a prediction result on blockage of a communication path to the another information processing device.

REFERENCE SIGNS LIST

11 Console
12 HMD
23 Control unit
26 Encoder unit
27 Wireless communication unit
28 Antenna
61 Antenna
62 Wireless communication unit
64 Video image generating unit
66 Video image displaying unit
67 Control unit
68 Inertia measuring unit

The invention claimed is:

1. A first information processing device, comprising:
circuitry configured to:
transmit transmission information to a second information processing device through wireless communication; and
control at least one of the wireless communication, encoding of the transmission information, or a processing process on the transmission information based on blockage prediction period information, wherein
the blockage prediction period information indicates prediction result on a blockage of a first communication path from the first information processing device to the second information processing device, and
the blockage prediction period information indicates a blockage start time of the blockage of the first communication path and a blockage duration for which the first communication path is blocked.

2. The first information processing device according to claim 1, wherein
the circuitry is further configured to generate the blockage prediction period information based on a movement line of an obstacle between the first information processing device and the second information processing device and a propagation route in a case where the first communication path is used.

3. The first information processing device according to claim 2, wherein
the circuitry is further configured to obtain the movement line based on a plurality of surrounding environment images at mutually different times, and
the plurality of surrounding environment images contain the second information processing device as a subject.

4. The first information processing device according to claim 2, wherein
the circuitry is further configured to obtain the propagation route based on arrival angle information and rotation angle information received from the second information processing device,
the arrival angle information indicates an angle of arrival of a signal sent from the first information processing device at the second information processing device, and
the rotation angle information indicates an orientation of the second information processing device.

5. The first information processing device according to claim 2, wherein
the circuitry is further configured to generate the blockage prediction period information for a plurality of communication paths including the first communication path used for the transmission of the transmission information.

6. The first information processing device according to claim 1, wherein
the circuitry is further configured to control switching of the first communication path used for the transmission of the transmission information based on the blockage prediction period information.

7. The first information processing device according to claim 6, wherein
in a case where the blockage of the first communication path is predicted, the circuitry is further configured to:
perform a training for a plurality of communication paths excluding the first communication path to be blocked during a training period; and
switch the first communication path to a second communication path of the plurality of communication paths, for which the training is performed, based on the blockage prediction period information.

8. The first information processing device according to claim 6, wherein
in a case where the blockage of the first communication path is predicted, the circuitry is further configured to:
perform a training for a plurality of communication paths excluding the first communication path to be blocked at a same timing as the first communication path being used; and
switch the first communication path to a second communication path of the plurality of communication paths, for which the training is performed, based on the blockage prediction period information.

9. The first information processing device according to claim 6, wherein
in a case where the first communication path is switched from a specific communication path to a second communication path, the circuitry is further configured to:
switch the first communication path from the second communication path to the specific communication path after a blockage period of the first communication path ends, wherein the blockage period is identified by the blockage start time and the blockage duration.

10. The first information processing device according to claim 1, wherein the circuitry is further configured to change an encoding method for the transmission information based on the blockage prediction period information.

11. The first information processing device according to claim 10, wherein
the circuitry is further configured to change the encoding method from a first encoding method used in a period including a blockage period of the first communication path to a second encoding method in which a picture in the transmission information is encoded as an I picture,
the transmission information includes video information including the picture, and
the blockage period is identified by the blockage start time and the blockage duration.

12. The first information processing device according to claim 10, wherein
the circuitry is further configured to change the encoding method from a first encoding method used in a period including a blockage period of the first communication path to a second encoding method in which a first picture in the transmission information is encoded as a picture whose reference target is a second picture outside the blockage period, wherein
the transmission information includes video information including the first picture, and
the blockage period is identified by the blockage start time and the blockage duration.

13. The first information processing device according to claim 1, wherein the circuitry is configured to:
generate control information that instructs the processing process on as the transmission information,
wherein the transmission information includes video information; and
transmit the control information to the second information processing device.

14. An information processing method, comprising:
in a first information processing device:
transmitting transmission information to a second information processing device through wireless communication; and
controlling at least one of the wireless communication, encoding of the transmission information, or a processing process on the transmission information based on blockage prediction period information, wherein
the blockage prediction period information indicates a prediction result on a blockage of a communication path from the first information processing device to the second information processing device, and
the blockage prediction period information indicates a blockage start time of the blockage of the communication path and a blockage duration for which the communication path is blocked.

15. A first information processing device, comprising:
circuitry configured to:
receive video information from a second information processing device through wireless communication; and
control a processing process on the video information based on blockage prediction period information, wherein
the blockage prediction period information indicates a prediction result on a blockage of a communication path to the second information processing device, and
the blockage prediction period information indicates a blockage start time of the blockage of the communication path and a blockage duration for which the communication path is blocked.

16. The first information processing device according to claim 15, wherein the blockage prediction period information is received from the second information processing device.

17. The first information processing device according to claim 15, wherein
the circuitry is further configured to:
select the processing process from a plurality of processing processes based on the blockage prediction period information; and
perform the selected processing process on the video information.

18. The first information processing device according to claim 15, wherein the processing process is one of a process of blurring a video image based on the video information, a process of adding a text message to the video image, or a process of displaying a captured image whose subject is a surrounding scene of the second information processing device in a partial region of the video image.

19. An information processing method, comprising:
in a first information processing device:
  receiving video information from a second information processing device through wireless communication; and
  controlling a processing process on the video information based on blockage prediction period information, wherein
    the blockage prediction period information indicates a prediction result on a blockage of a communication path to the second information processing device, and
    the blockage prediction period information indicates a blockage start time of the blockage of the communication path and a blockage duration for which the communication path is blocked.

* * * * *